(12) United States Patent
Poole

(10) Patent No.: US 12,498,500 B2
(45) Date of Patent: Dec. 16, 2025

(54) SEISMIC DATA RECORDING AND PROCESSING WITH DIFFERENT UNCONTAMINATED RECORDING TIME LENGTHS

(71) Applicant: CGG SERVICES SAS, Massy (FR)

(72) Inventor: Gordon Poole, East Grinstead (GB)

(73) Assignee: CGG SERVICES SAS, Massy (FR)

( * ) Notice: Subject to any disclaimer, the term of this patent is extended or adjusted under 35 U.S.C. 154(b) by 453 days.

(21) Appl. No.: 17/945,368

(22) Filed: Sep. 15, 2022

(65) Prior Publication Data
US 2023/0103043 A1 Mar. 30, 2023

Related U.S. Application Data

(60) Provisional application No. 63/249,719, filed on Sep. 29, 2021.

(51) Int. Cl.
*G01V 1/30* (2006.01)
*G01V 1/34* (2006.01)

(52) U.S. Cl.
CPC .............. *G01V 1/306* (2013.01); *G01V 1/345* (2013.01)

(58) Field of Classification Search
CPC .................. G01V 1/306; G01V 1/345; G01V 2210/1293; G01V 1/301
See application file for complete search history.

(56) References Cited

U.S. PATENT DOCUMENTS

| | | | |
|---|---|---|---|
| 10,670,757 B2 * | 6/2020 | Baardman | G01V 1/364 |
| 11,255,992 B2 * | 2/2022 | Poole | G01V 1/375 |
| 11,573,344 B2 * | 2/2023 | Drange | G01V 1/282 |
| 2014/0303898 A1 * | 10/2014 | Poole | G01V 1/003 |
| | | | 702/17 |

(Continued)

FOREIGN PATENT DOCUMENTS

| | | |
|---|---|---|
| EP | 2787370 A2 | 10/2014 |
| EP | 2787371 A2 | 10/2014 |

(Continued)

OTHER PUBLICATIONS

Cang Peng et al., "Inversion-based 3D deblending of towed-streamer simultaneous source data using sparse TauP and wavelet transforms," 2016, SEG International Exposition and 86th Annual Meeting, SEG Technical Program Expanded Abstracts, pp. 4607-4611.

(Continued)

*Primary Examiner* — Manuel A Rivera Vargas
(74) *Attorney, Agent, or Firm* — PATENT PORTFOLIO BUILDERS PLLC

(57) ABSTRACT

A method for generating an image of a subsurface based on blended seismic data includes receiving the blended seismic data, which is recorded so that plural traces have uncontaminated parts with different uncontaminated recording time lengths, selecting plural subgroups (SG1, SG2) of traces so that each subgroup (SG1) includes only uncontaminated parts that have a same uncontaminated recording time length, processing the traces from each subgroup to generate processed traces, mapping the processed traces to a same sampling, combining the processed traces from the plural subgroups (SG1, SG2) to generate combined processed traces, and generating an image of a structure of the subsurface based on the combined processed traces.

18 Claims, 19 Drawing Sheets

(56) References Cited

U.S. PATENT DOCUMENTS

2015/0241587 A1* 8/2015 Baardman .............. G01V 1/364
702/17
2020/0200933 A1* 6/2020 Drange .................. G01V 1/307

FOREIGN PATENT DOCUMENTS

| GB | 2579277 A | 6/2020 |
|----|-----------|--------|
| WO | 2019164405 A1 | 8/2019 |
| WO | 2019243562 A1 | 12/2019 |
| WO | 2021050289 A2 | 3/2021 |
| WO | 2022155676 A1 | 7/2022 |

OTHER PUBLICATIONS

Jing Sun et al., "A convolutional neural network approach to deblending seismic data," Jul. 2020, Geophysics, vol. 35, No. 4, pp. WA13-WA26.

Peeter Akerberg et al., "Simultaneous source separation by sparse Radon transform," 2008, SEG Las Vegas 2008 Annual Meeting, pp. 2801-2805.

R.R. Haacke et al., "Simultaneous shooting for sparse OBN 4D surveys and deblending using modified Radon operators," 77th EAGE Conference & Exhibition 2015 IFEMA Madrid, Spain, Jun. 1-4, 2015, 5 pages.

Ray Abma et al., "Popcorn shooting: Sparse inversion and the distribution of airgun array energy over time," Sep. 2013, SEG Houston 2013 Annual Meeting, pp. 31-35.

S. Hou et al., "Seismic processing with deep convolution neural networks: Opportunities and challenges," EAGE2020: Annual Conference Online Dec. 2020, 5 pages.

Stian Hegna et al., "Benefits of continuous source and receiver side wavefields," 2018, SEG International Exposition and 88th Annual Meeting, pp. 41-45.

Search Report in corresponding/related British Application No. GB2214024.8 dated Mar. 6, 2023.

* cited by examiner

SEISMIC DATA RECORDING AND PROCESSING WITH DIFFERENT UNCONTAMINATED RECORDING TIME LENGTHS

BACKGROUND

Technical Field

Embodiments of the subject matter disclosed herein generally relate to methods and systems for recording and processing seismic data and, more particularly, to mechanisms and techniques for recording seismic data having different uncontaminated recording time lengths during the acquisition stage so that during the processing stage, various structures in the subsurface may be imaged more clearly.

Discussion of the Background

Seismic data acquisition and processing may be used to generate a profile (image) of geophysical structures under the ground (subsurface). While this profile does not provide an accurate location for oil and gas reservoirs, it suggests, to those trained in the field, the presence or absence of such reservoirs. Thus, providing a high-resolution image of the subsurface is important, for example, to those who need to determine where the oil and gas reservoirs are located.

Seismic acquisition and processing may be on land, in the marine environment, or in a transition zone. Marine datasets may be recorded by towed streamers, ocean bottom receivers (cable or node), receivers attached to buoys, autonomous receivers in the water column, or nearfield receivers (hydrophone, accelerometer, geophone, etc.). Seismic sources may include airguns, sparkers, pingers, boomers, dynamite, land vibrators, marine vibrators, or another source. Sources may consist of one source element or an array of source elements.

During a seismic survey, when the source (either land source or marine source) is fired according to a standard data acquisition plan, a subsequent recording time is defined so that all useful reflected/diffracted energy is recorded before the next source is fired. The recording time is constant and universal for all the traces recorded during the seismic survey. This delay time imposes constraints on the acquisition rate and, hence, increases the cost of acquisition.

To reduce the acquisition time, it is possible to simultaneously shoot the sources. The term "simultaneously" should be loosely interpreted in this description, e.g., if first and second sources are considered, the second source may fire less than a second after the first source was fired, and the shooting is still considered to be simultaneous. Generally speaking, the term "simultaneous" encompasses those cases in which the second source fires during the listening time corresponding to the first source. From the seismic receivers' point of view, acquisition of simultaneous source data means that the signals from two or more sources interfere during a given listening time, at least for part of the acquired seismic record. Traditional listening time may be in the range of 1 second to 12 seconds. For high-frequency shallow imaging projects, the listening time may be less, for example, 200 ms. By acquiring data in this way, the time taken to shoot a dataset is reduced, along with acquisition costs. As an alternative to reducing the acquisition time, a higher density dataset may be acquired in the same time. For such data to be useful, it is necessary to develop processing algorithms to handle source interference (cross-talk noise).

Source interference appears because subsurface reflections from an early source excitation may be comingled with those that have been excited from a later source position, i.e., a "blended source" survey is acquired. Note that this is in contrast to conventional non-blending surveying techniques, wherein the returning subsurface reflections from one source are not allowed to overlap with the reflections of another source. Although the blended-source approach has the potential to reduce time in the field, thereby proportionally reducing the survey cost, one problem with such an approach is that it can be difficult to separate the individual shots thereafter, which is necessary in the processing stage. This leads to generating images of the subsurface which are not very sharp. All the above-discussed methods rely on randomized shooting.

In the following, a non-blended source survey is discussed in more details. Source elements of a given source may be fired simultaneously (synchronized) or at different times (desynchronized). Examples of desynchronized firing may include those discussed in [1] or [2]. Normally, a shotpoint interval is chosen based on a maximum two-way travel time (TWT) of interest for the deepest geological formation of interest. This allows a source to be fired, and all signals of interest to be recorded before the next source firing. Based on a nominal boat speed (e.g. 2.5 m/s), the shot-point spacing in metres may be defined as follows: Minimum shot spacing (m)=Boat speed (m/s) times Maximum required TWT (s), i.e.:

$$2.5 \text{ m/s} \cdot 5 \text{ s} = 12.5 \text{ m}$$

In this example, a 12.5 m shot spacing along the inline direction X would result in contamination (also known as cross-talk) from the following source actuation being recorded after about 5 seconds. This means that each trace recorded during this seismic survey has a constant 5 seconds record length that is uncontaminated with cross-talk from other sources followed by a cross-talk record length. Thus, the processing of the recorded traces may be limited to 5 seconds (i.e., only to the uncontaminated region), or the cross-talk may be removed using deblending methods (e.g., [3] or [4]).

For a fixed shotpoint spacing (in m), the cross-talk may arrive later than 5 seconds if the boat travels more slowly than 2.5 m/s, or may arrive earlier than 5 seconds if the boat travels more quickly than 2.5 m/s. FIG. 1 shows a shotpoint gather 100 in the space-time domain. The first source actuation is at 0 seconds, and cross-talk from the following source actuation arrives at about 5.3 seconds. It is noted that any structure 110 that is located above the arrival 122 of the following source actuation can be clearly imaged due to the corresponding uncontaminated record. However, any structure in the region 120, below the arrival 122 of the following source actuation, is masked by the cross-talk from this late arrival.

Another situation in which the late arrival of one source element masks possible structures 110 in the data recorded from another source element is discussed with regard to FIG. 2. In this situation, two or more sources S1 to S3 are towed by a vessel 210 along an inline direction X, and the sources S1 to S3 are spread along the cross-line direction Y. The currents in the water may lead to crabbing, i.e., a situation where the sources S1 to S3 do not lay on a line H perpendicular to the shooting direction X, as shown in FIG. 2. Note that in the first instance in FIG. 2, the sources S1 to S3 lay on such a line PP, while for the second instance, the sources S1' to S3' are staggered relative to line H.

In this case, the port source S3' may reach its desired shooting (preplot) position PP earlier than planned, and the starboard source S1' may reach its preplot position later than planned. This may result in cross-talk following actuation of the starboard source arriving earlier than expected. For this reason, the sources may be fired based on their average X-position of all sources (sometimes referred to as 'centre of source'). An alternative is to select a reference source whose position is used for triggering of the other source(s).

Thus, there is a need for alternative acquisition and processing methods that are capable of acquiring seismic data more suitable for revealing a subsurface structure when blending is present.

SUMMARY OF THE INVENTION

According to an embodiment, there is a method for generating an image of a subsurface based on blended seismic data. The method includes receiving the blended seismic data, which is recorded so that plural traces have uncontaminated parts with different uncontaminated recording time lengths, selecting plural subgroups (SG1, SG2) of traces so that each subgroup (SG1) includes only uncontaminated parts that have a same uncontaminated recording time length, processing the traces from each subgroup to generate processed traces, mapping the processed traces to a same sampling, combining the processed traces from the plural subgroups (SG1, SG2) to generate combined processed traces, and generating an image of a structure of the subsurface based on the combined processed traces.

According to another embodiment, there is a computing device for generating an image of a subsurface based on blended seismic data. The computing device includes an interface configured to receive the blended seismic data, which is recorded so that plural traces have uncontaminated parts with different uncontaminated recoding time lengths, and a processor coupled to the interface. The processor is configured to select plural subgroups (SG1, SG2) of traces so that each subgroup (SG1) includes only uncontaminated parts that have a same uncontaminated recording time length, independently process the traces from each subgroup to generate processed traces, map the processed traces to a same sampling, combine the processed traces from the plural subgroups (SG1, SG2) to generate combined processed traces, and generate an image of a structure of the subsurface based on the combined processed traces.

According to yet another embodiment, there is a method for acquiring blended seismic data of a subsurface. The method includes towing first and second seismic sources S1, S2 above the subsurface, firing the first and second seismic sources S1, S2 with corresponding first and second lags, L1 and L2, respectively, relative to pre-determined shotpoints, wherein the first lag L1 is different from the second lag L2, and recording blended seismic data corresponding to the shooting of the first and second seismic sources S1, S2. The blended seismic data includes plural traces having cross-talk free parts with different uncontaminated recording time lengths.

BRIEF DESCRIPTION OF THE DRAWINGS

For a more complete understanding of the present invention, reference is now made to the following descriptions taken in conjunction with the accompanying drawings, in which:

FIG. 10A illustrates regular preplot positions for a marine acquisition system while

FIG. 13A illustrates migrated seismic data from a dual source with a first recording time length, while FIG. 13B illustrates migrated seismic data from a single source, with a second recording time length, different from the first recording time length;

DETAILED DESCRIPTION OF THE INVENTION

Figure 1:
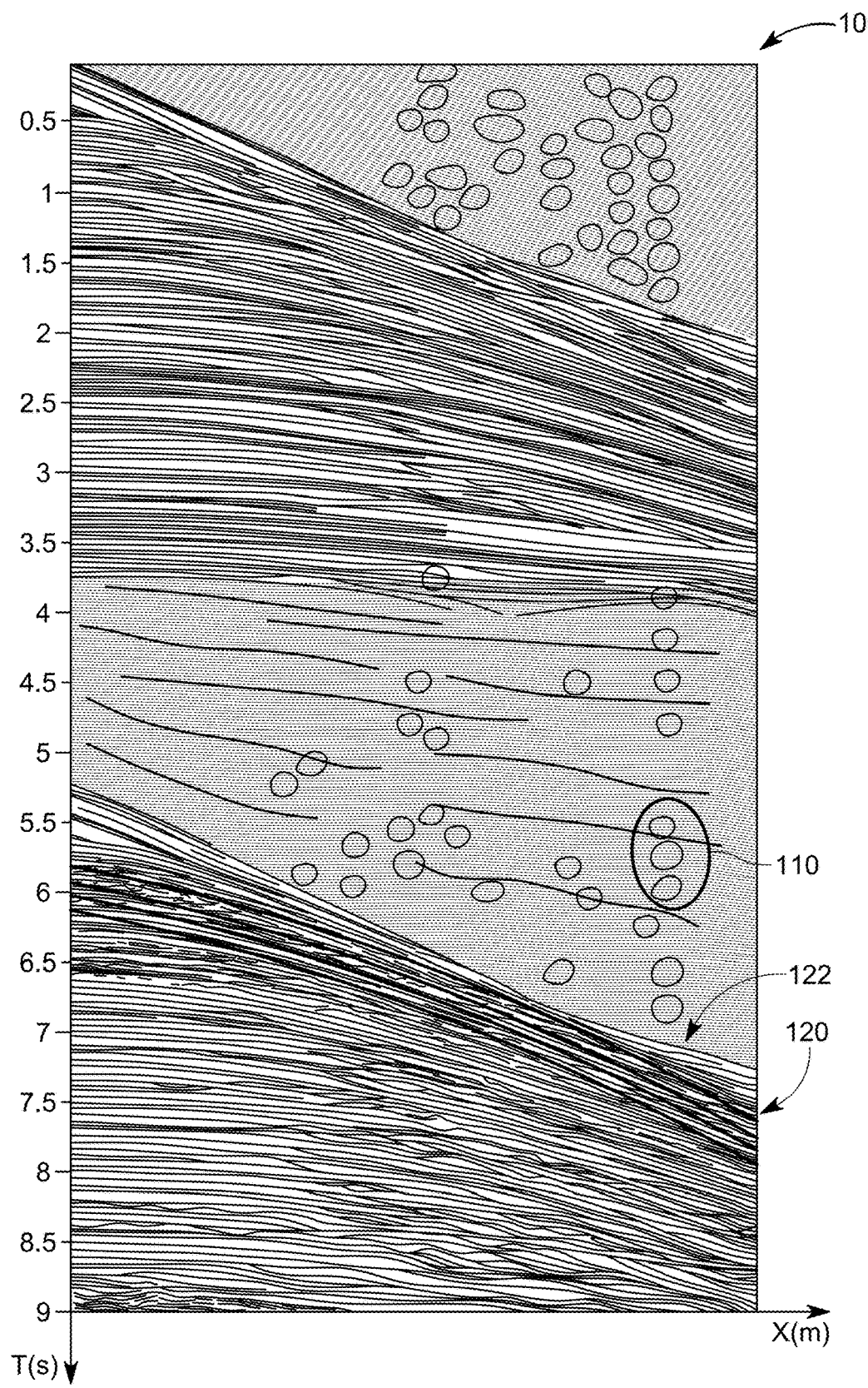
FIG. 1 illustrates a shot gather from towed streamer acquisition showing cross-talk arising from the following shot.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a marine seismic system. However, the embodiments to be discussed next are not limited to a marine seismic system, but may also be applied to a land seismic system, transition zone, autonomous node positioned in a water column or ocean bottom survey (node or cable) (OBS) system. Further, the embodiments discussed herein may be used for subsurface structures suitable for storage of carbon dioxide, exploitation of geothermal resources, and surveying structures suitable for optimal locations for wind turbine placement.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a method for asymmetrically collecting the seismic data so that the uncontaminated recorded time lengths for different groups of traces do not match, which can be exploited during the processing stage, for more clearly imagining subsurface structures which are traditionally difficult to capture. The processes involved for achieving these goals are now discussed with regard to the figures.

The novel method for acquiring the seismic data with different uncontaminated recorded time lengths is discussed first followed by the novel method for processing the acquired seismic data. It is noted that the advantages of the processing stage cannot be achieved without the specific characteristics of the acquisition phase. In other words, unless the seismic data is recorded as now discussed, the processing methods discussed herein cannot reveal the difficult to capture subsurface structures. The embodiments to be discussed next, which may be used on land, in marine environment, or in a transition zone, have a constant or controlled variable source actuation bias (in time or space) for a subset of the shotpoints. A shotpoint is a point in space where a seismic source is supposed to fire and the shotpoints are preestablished before the seismic survey is performed. In this embodiment, for a first subset of shotpoints, the actuation is different (has a lag) from a second subset of shotpoints. The term "subset" is used herein to refer to a selection or group of shotpoints which share substantially the same lag (which corresponds to a group of traces that share the same uncontaminated recorded time lengths). Thus, if two different lags are used, there are two subsets of shotpoints, a first one having the first lag and a second one having the second lag.

Figure 3:
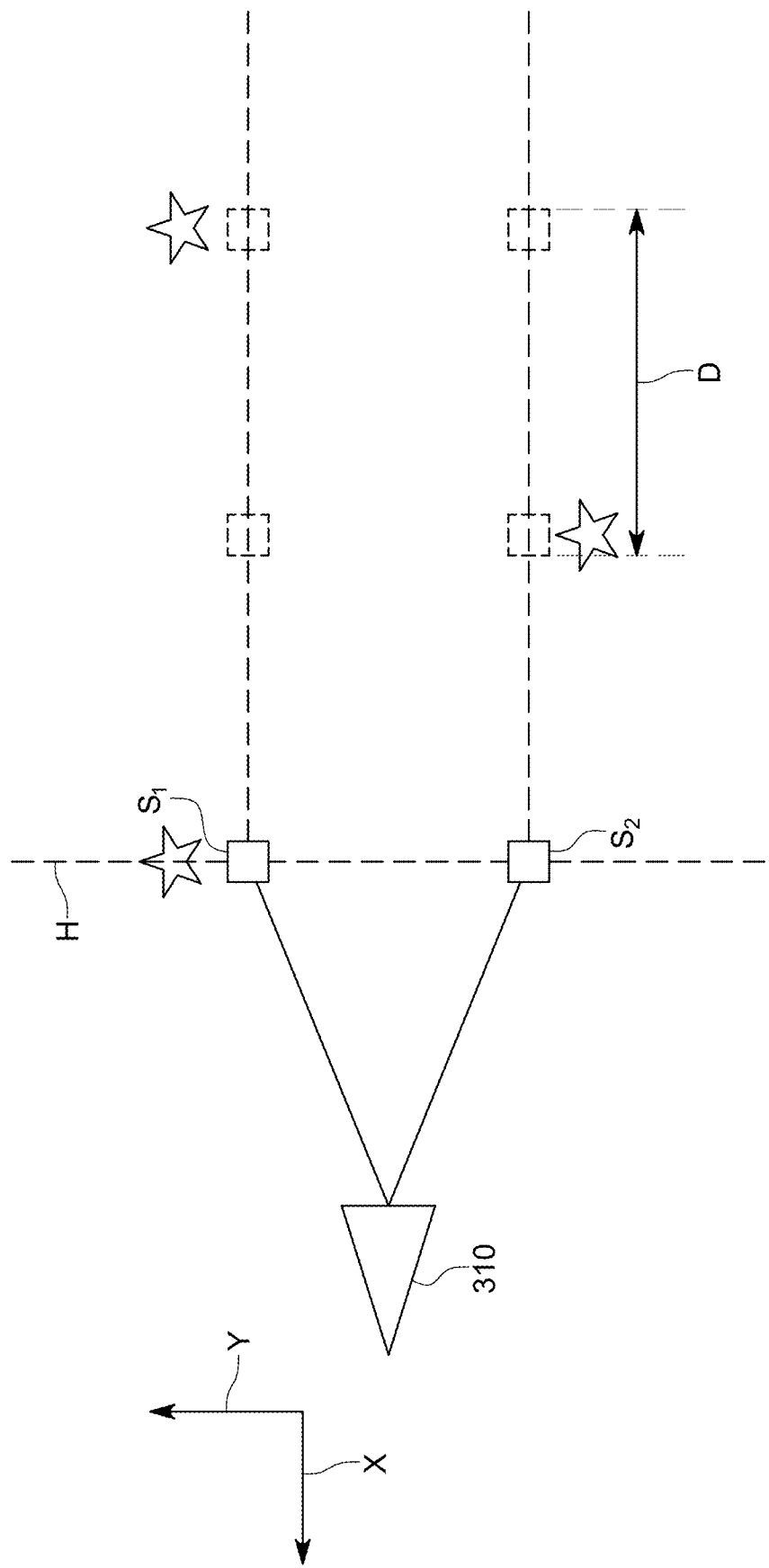
FIG. 3 illustrates a seismic acquisition system that includes one vessel and two sources that are alternately shot at given shotpoints.
Figure 4A:
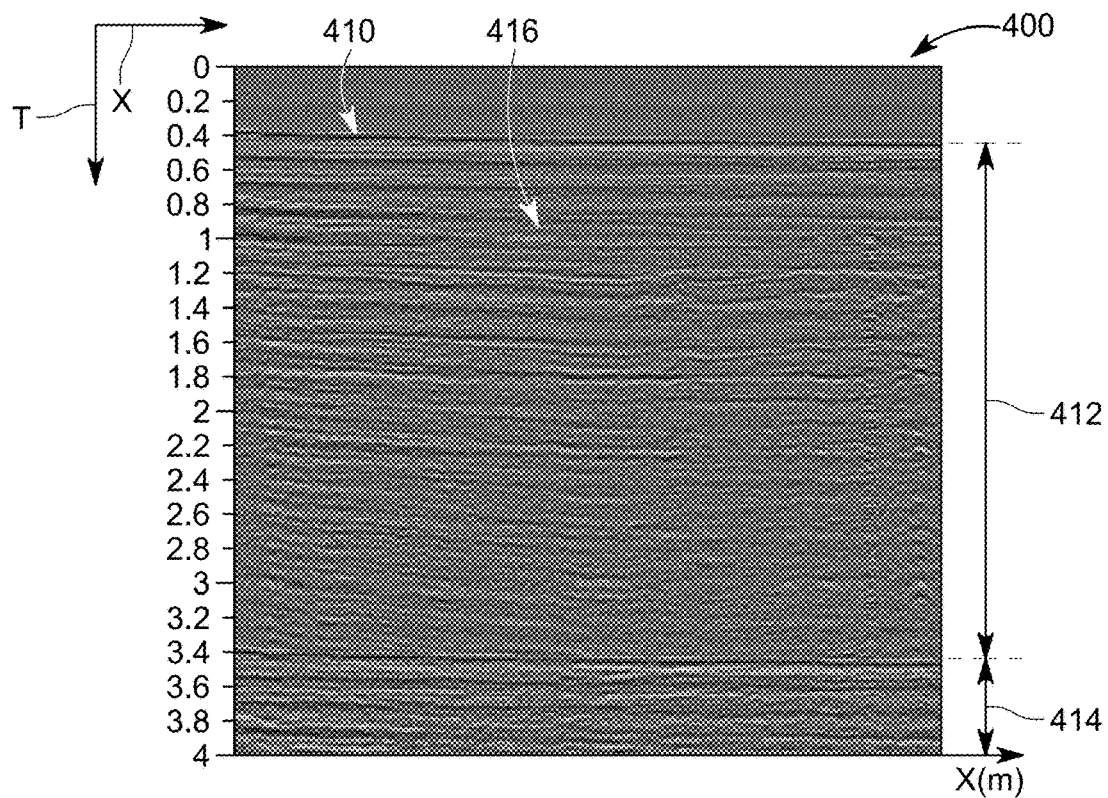
FIGS. 4A and 4B illustrate the common channel for the two sources shown in FIG. 3, with each trace having the same uncontaminated recording time length.
Figure 4B:
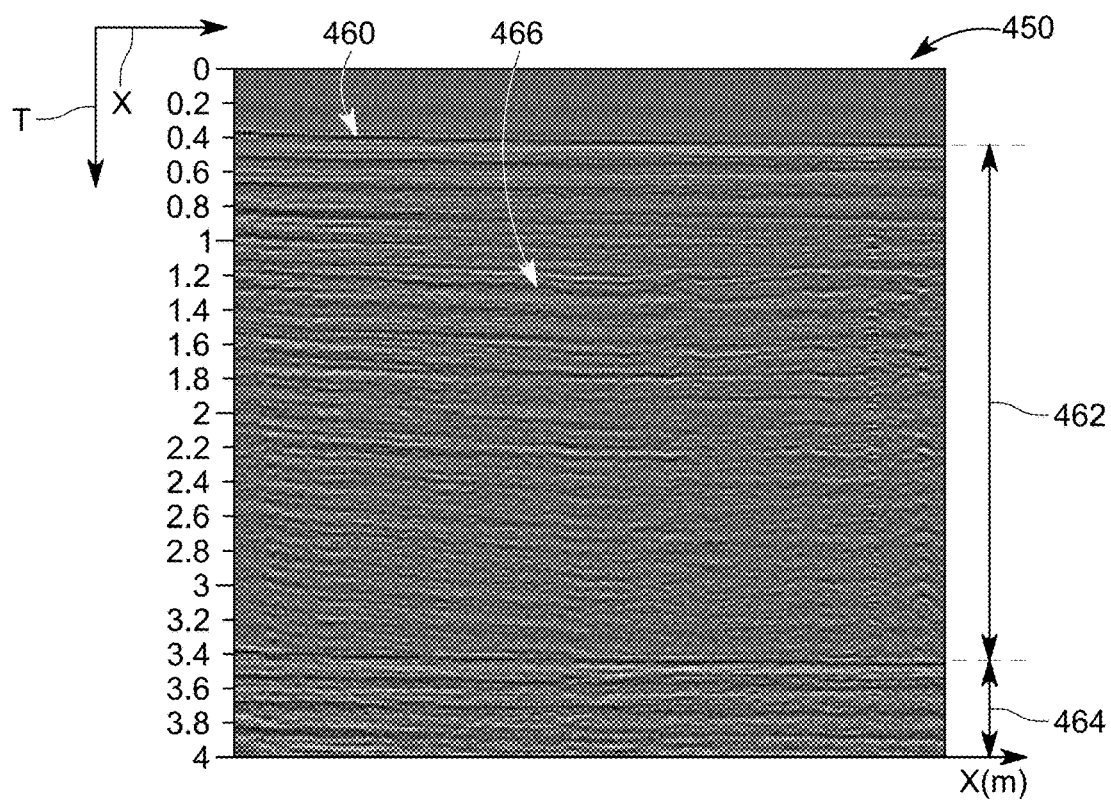

To better understand the consequences of having subsets of shotpoints with different lags, a first example relating to a dual-source acquisition with no lag or the same lag is discussed, followed by a dual-source acquisition with different lags for different subsets of shotpoints. The first example involves a vessel 310, as shown in FIG. 3, that tows two sources S1 and S2. Each source may include plural source elements, e.g., individual guns. For this example, the vessel 310 moves along inline direction X, and the two sources S1 and S2 are located along line H, on the cross-line direction, Y, which is perpendicular to the inline direction X. The vessel is assumed to advance along inline X with a speed of 2.5 m/s with shotpoint actuations spaced at a distance D=7.5 m (preplot positions). The star symbol in FIG. 3 indicates which source is shot and where. This means that the actuation time of source S2 after the actuation of source S1 is 3 seconds, i.e., t=D/v=7.5/2.5=3 s. The common channel 400 for source S1 is shown in FIG. 4A and the common channel 450 for source S2 is shown in FIG. 4B. Note that the ordinate axis in these figures corresponds to the time and the abscissa axis corresponds to the inline direction X. Each of the common channels in FIGS. 4A and 4B show the (1) waterbottom arrivals 410, 460, (2) the non-contaminated parts 412, 462 (or uncontaminated recorded time lengths) of the traces 416 and 466, respectively, which are generated by a single source, and (3) the contaminated (cross-talk) parts 414, 464 of the traces 416, 466, respectively, which correspond to the blending of the two sources S1 and S2. It is noted from these figures that the lengths of the non-blended or no cross-talk or substantially uncontaminated recording time parts 412 and 462 are the same, starting at the same initial time (e.g., about 0.4 s in this embodiment) and ending at the same final time (e.g., about 3.4 s in this embodiment). This means that the sources S1 and S2 were activated at the shotpoints with no lags.

Figure 5:
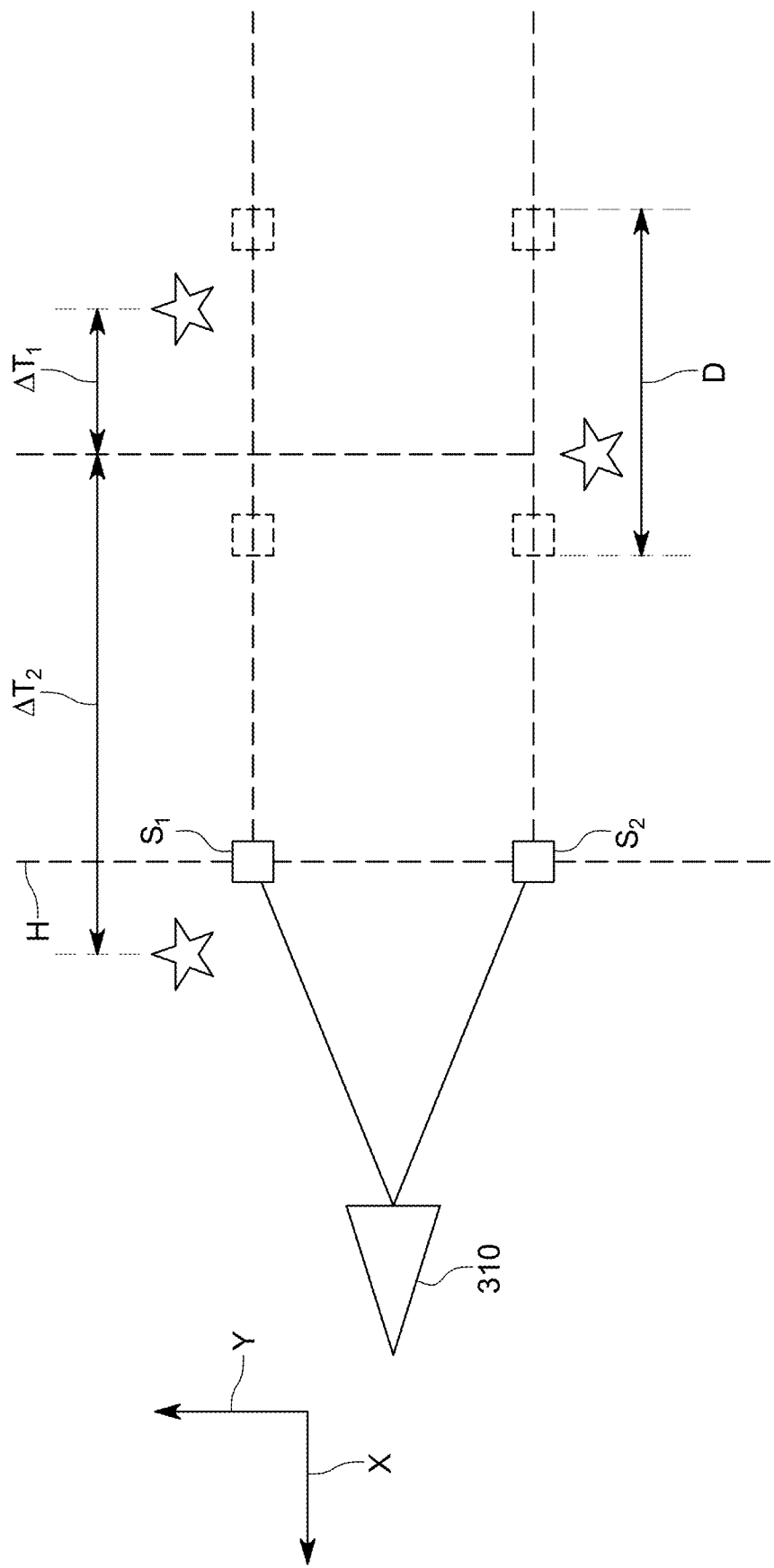
FIG. 5 illustrates a seismic acquisition system that also includes one vessel that tows two sources but the sources are shot with different lags relative to the given shotpoints.

Different from this traditional seismic data generation and acquisition, a novel acquisition phase is illustrated in FIG. 5, where the preplot spacing D is selected to be 12.5 m along the inline direction, for a vessel speed of 2.5 m/s, which results in a nominal shooting rate of 5 s. For regular acquisition, the source actuation time (also known as shot-predict time) for a given pre-plot shot location is determined based on time (e.g., GPS time), boat speed, and the pre-plot shot location. For this novel arrangement, the port-source S1 fires (see the star symbol in the figure) at the shot-predict time+a first shot lag L1 (e.g., 500 ms), while the starboard-source S2 fires (see the star symbol in the figure) at the shot-predict time+a second lag L2, which is different from the first lag L1, e.g., at the time shot-predict time−500 ms. Note that the squares in FIG. 5 correspond to the pre-plot positions while the stars correspond to actual shooting locations, which is a combination of the shot-predict time and the first or second lag times. Also note that the lags may be positive or negative.

Figure 6A:
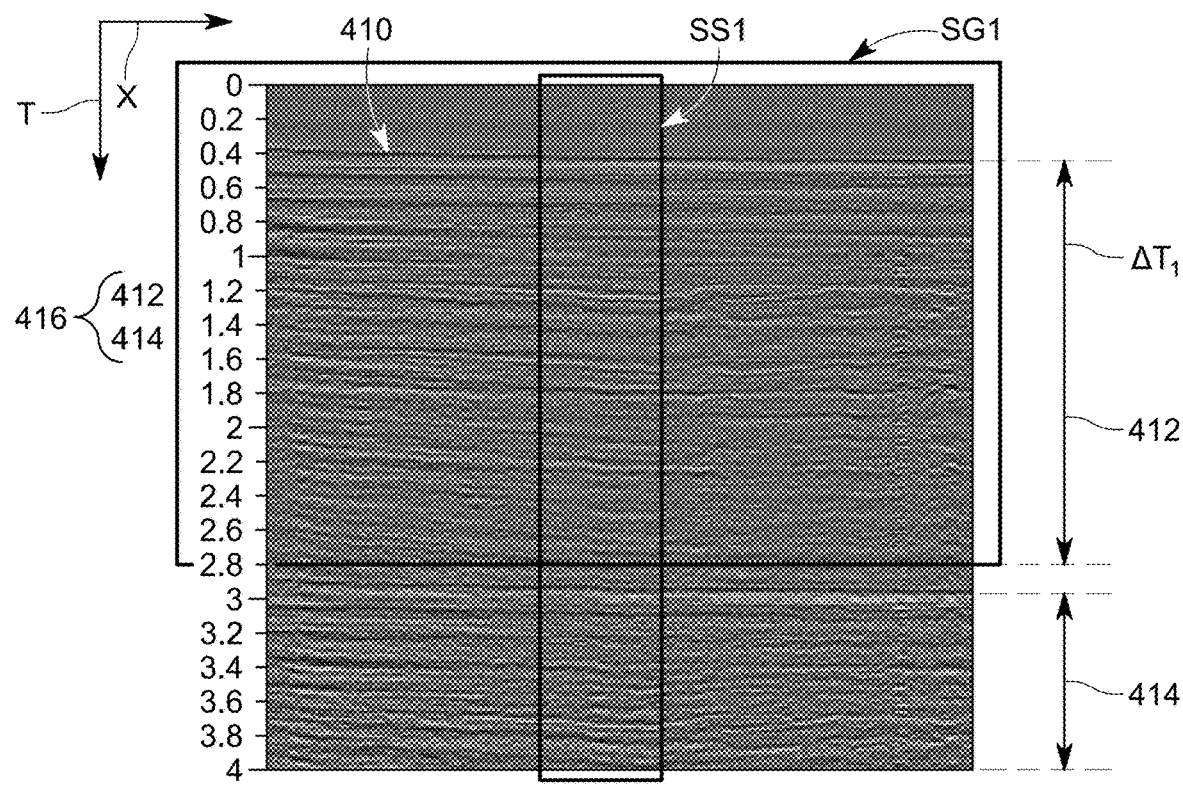
FIGS. 6A and 6B illustrate the common channel for the two sources shown in FIG. 5, with the traces from one source having a longer uncontaminated recording time length than the traces from the other source due to the different lags.
Figure 6B:
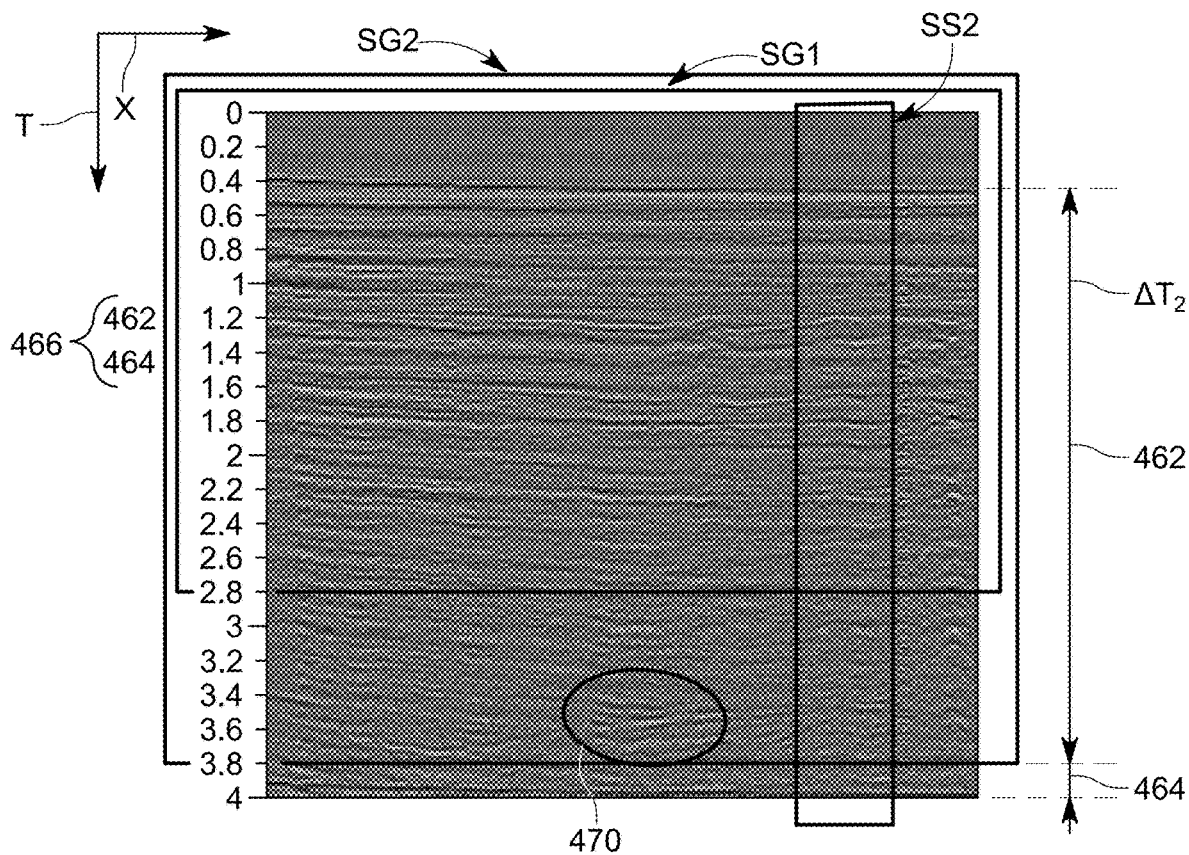

This novel shooting scheme makes the starboard source S1 uncontaminated recorded parts 412 to have a time interval $\Delta T_1$ of about 2.8 s for this specific embodiment (note that other time intervals may be obtained by changing the speed of the vessel and/or the distance D between the shootpoints) until the cross-talk part 414 appears, as shown in FIG. 6A, while the port source S2 uncontaminated recorded part 462 has a time interval $\Delta T_2$ of about 3.8 s until the cross-talk part 464 appears, as shown in FIG. 6B. The difference in length of the cross-talk free parts 412 and 462 of the traces 416 and 466 illustrated in FIGS. 6A and 6B is due to the different time lags used to shoot the sources and record the seismic data (1 s overall). The fact that the lengths of the uncontaminated trace parts 412 and 462 is different makes possible to more clearly identify subsurface structures 470, which otherwise are masked by the cross-talk parts, for both sources, as illustrated in FIGS. 4A and 4B. In a sense, the longer uncontaminated recorded time length of a trace, which is obtained at the expense of the shorter uncontaminated recorded time length of another trace, has a wider range of the cross-talk free region, and this region can be used, as later discussed for the processing phase, to guide the deblending of the cross-talk contaminated part 414 of the trace 416.

The shot-predict time for this and other embodiments to be discussed herein may be based on the positioning of each individual source Si, a nominated source (e.g., S2), or on the average shot position (centre of source relative to the inline direction). In this example, a first subset of shotpoints relates to when the starboard source fires, and the second subset of shotpoints relates to when the port source fires. This approach may be generalized for more or less sources. For example, a single source acquisition may involve firing odd shotpoints 500 ms earlier than shot-predict time, and even shotpoints 500 ms later than the shot-predict time. In this case, the odd shots may have 1 second extra uncontaminated recording time, relative to even shots, before cross-talk from the following shotpoint is recorded. In this case, the first subset of shotpoints may relate to odd shotpoint actuations, and the second subset of shotpoints may relate to even shotpoint actuations. More than two subsets of shotpoints may be used. Note that in the case sub-sets are defined by odd and even shotpoints, and more than two sources are fired in sequence, a sub-set may contain actuations from more than one source.

Figure 2:
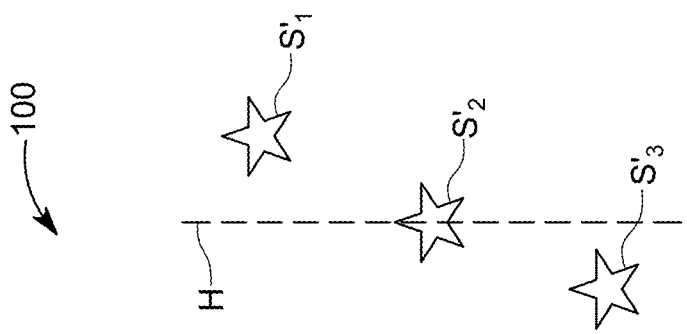
FIG. 2 illustrates the crabbing phenomenon when seismic sources are towed in water by a vessel.
Figure 2:
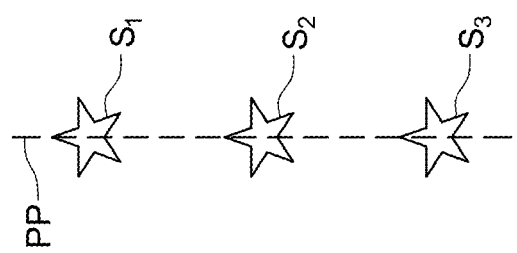
Figure 2:
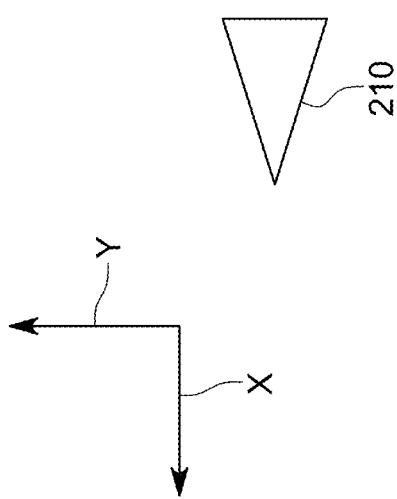

During the acquisition phase, the shooting times (or shot-predict times) are calculated based on the source's position, vessel (source) speed, and the required shotpoint locations (preplot locations). The previous embodiment assumed a constant vessel speed, which in practice is generally not be the case. As discussed previously, crabbing (see discussion related to FIG. 2) can cause one source to fire relatively earlier than the other, resulting in variable and uncontrolled timing variations of the signal from the following shot actuation. Note that such random time delays are different from the calculated lag times which are selected for achieving the different uncontaminated recorded time lengths. In one application, the different uncontaminated recorded time lengths are selected to have at least 1 s recording differences between two different shotpoints, which is not the case for the random delays which may be in the range+/−200 ms. This is also different in the embodiment illustrated in FIG. 5 as the time lags between the firing of the sources is well controlled, so that the time lags are constant during the acquisition phase, i.e., they do not vary randomly. Firing the sources based on the 'centre-of-source' criterion can overcome this random timing error. In this case the average x-position of both sources is considered to calculate the shot-predict time.

Figure 7:
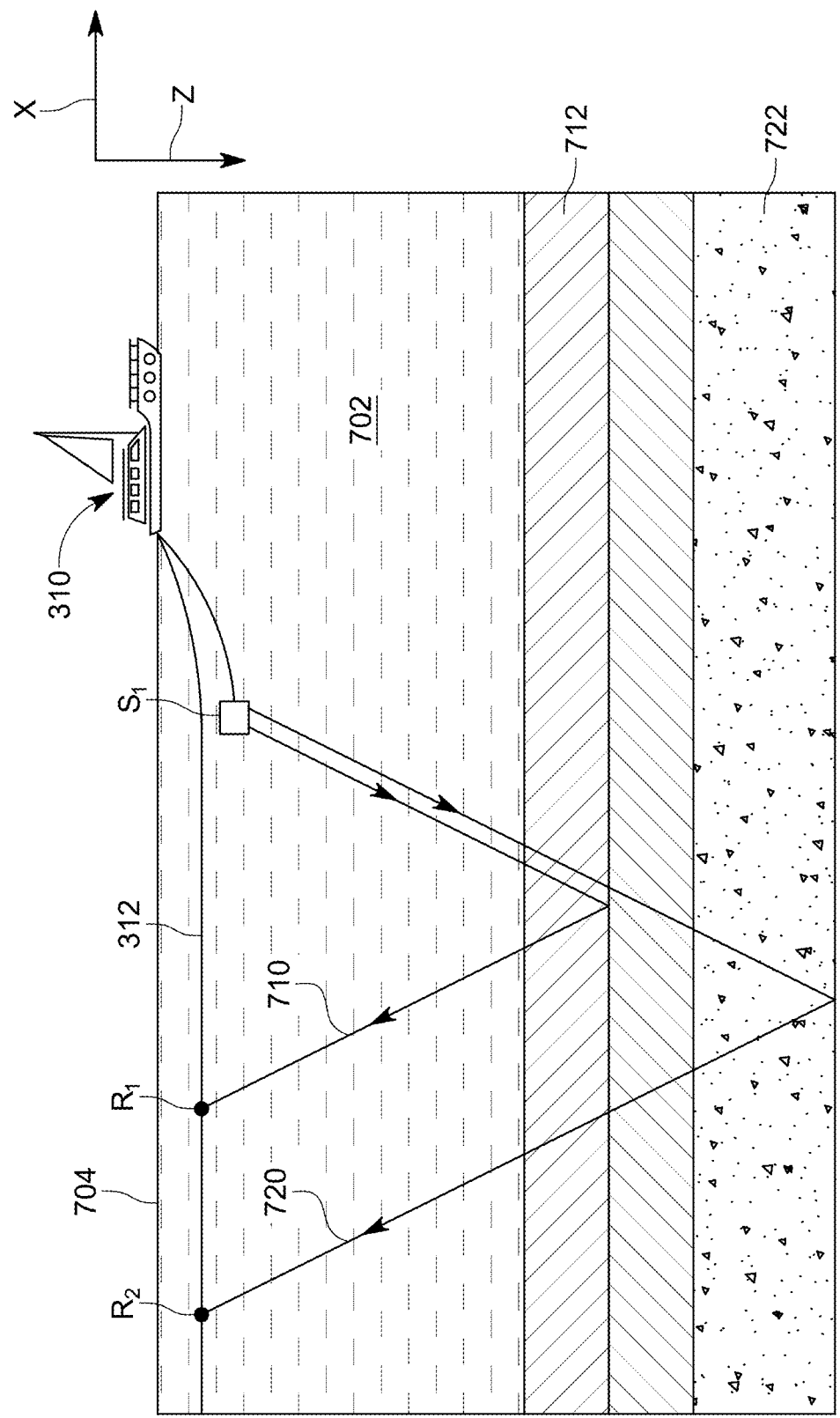
FIG. 7 illustrates how the shallow and deep portions of the explored area generate traces with different frequencies and their imagining requires different spatial densities.

In most cases, seismic reflections 710 from a shallow section 712 of the surveyed area has higher frequency and is spatially more variable than seismic reflections 720 from the deep section 722, as shown in FIG. 7. FIG. 7 shows the vessel 310 towing the sources (only source S1 is visible) and streamers 312 (only one streamer is visible in cross-section) having plural seismic sensors R1, R2. The streamer floats in the water 702, below the water surface 704. The deeper seismic reflections 720 have undergone more absorption, making them lower in frequency, and the returning wavefronts are spatially less variable. For this reason, spatial sampling for the deep section 722 need not be as dense as it is for the shallow section 712. A similar concept is used for longer offsets whereby the streamer spacing may increase with increasing offset, a technique used to avoid infill due to streamer feather.

The lag selection for firing the sources affects the cross-talk parts 414, 464's length of the traces subsets. FIGS. 6A and 6B discussed above show an example for the same dual-source setup used in FIG. 3 where the overall lag time difference between two consecutive shootpoints is 1 s. In another embodiment, the first source S1 is firing 1000 ms later than its shot-predict time (first shotpoint subset), and the second source S2 is firing 1000 ms earlier than its shot-predict time (second shotpoint subset). This has the effect of decreasing the arrival time of the following shot energy for the first source S1 traces by 2 seconds, and increasing the arrival time of the following shot energy for the second source S2 traces by 2 seconds. Now more recording time is unaffected by cross-talk for the deep section for the second source S2, at the expense of less unaffected recording time for the first source S1. As discussed earlier, overall this may be preferable as there is denser shotpoint sampling in the shallow reflections coming from both sources, and more extended the trace length in the deep section for one source. In some cases, cross-talk can be attenuated, but the quality of deblending is hard to guarantee and often results in some signal damage or residual noise.

Alternative shooting strategies may be employed for achieving the different lengths of the uncontaminated parts 412 and 462 of the traces 416 and 466, respectively. According to one embodiment, it is possible to fire the first source S1 at the pre-established shot-predict times, and to fire the second source S2 1 second earlier than the shot-predict times. In another embodiment, it is possible that the first source S1 is firing 1 second later than the shot-predict time, and the second source S2 is firing at the shot-predict time. The substantially uncontaminated recording time for a given trace may be defined (which corresponds to the already discussed parts 412 and 462 of the traces as illustrated in FIGS. 6A and 6B) as the time taken after actuation of one source until the next source is actuated. Thus, for a two-source acquisition setup with a nominal shooting rate N (=shot point spacing/vessel speed), the following shooting lags may be selected:

First source S1: Lag A
Second source S2: Lag B, with B different than A and both A and B being real numbers.

The substantially uncontaminated recording time for the two sources is then given, according to this embodiment, by:

First source S1: N−A+B
Second source S2: N−B+A

In another embodiment, the desired substantially uncontaminated recording time lengths (aka, the cross-talk free parts 412, 462 of the traces discussed above with regard to FIGS. 6A and 6B) may be determined through analysis of the anticipated geological formations in the surveyed area, for example based on previous surveys. For this case, suppose that a previous survey generated the migrated seismic data shown in FIG. 8, in the space-time domain. The shallow section 810 of the surveyed subsurface is separated from the deep section 812 by a border indicated by the line 814 in FIG. 8. Thus, the extent of the shallow section 810 varies with the position of the source along the inline direction X, as shown by line 814. This means that the lag applied to the sources needs to vary according to the profile of the line 814. Note that this change is not random or constant, but follows a geographical feature (e.g., porosity, impedance, reflectivity, etc.) of the surveyed subsurface.

A maximum substantially uncontaminated recording time length (corresponding to the lengths of the part 462 of the traces 466) for deeper structures 816 with lower frequencies that may only need a coarse shotpoint sampling, and a minimum substantially uncontaminated recording time (corresponding to the lengths of the part 412 of the traces 416) for shallower structures containing higher frequencies that may need a finer shotpoint sampling may be defined. Shotpoint spacing and lag values for a nominal vessel speed may be chosen such that the substantially uncontaminated recording times for the two sources satisfy desired requirements.

In one embodiment, desired substantially uncontaminated recording time lengths may vary spatially based on the two-way traveltime of signals of interest. Based on the geology of FIG. 8, the minimum substantially uncontaminated recording time length may be spatially varied, as the vessel or sources advance along the inline direction X, to ensure data recorded in the shallow section (above the line 814) is substantially uncontaminated by cross-talk noise from the following shotpoint actuation. Note that the deep signals have a substantially lower frequency content, and as such would be uncontaminated by only a subset of shotpoints. Lag values may be designed to optimally preserve this spatially variable minimum substantially uncontaminated recording time length. Also note that when the traces from FIG. 6A are combined with those from FIG. 6B, for example, only for the non-contaminated parts of the traces, the combined traces have a denser spatial sampling as there are traces from both sources. In other words, FIG. 6A shows traces corresponding only to the first source while FIG. 6B shows traces corresponding only to the second source. When these traces are combined, the spatial density of the traces is increased as there are now traces from both sources.

Figure 9A:
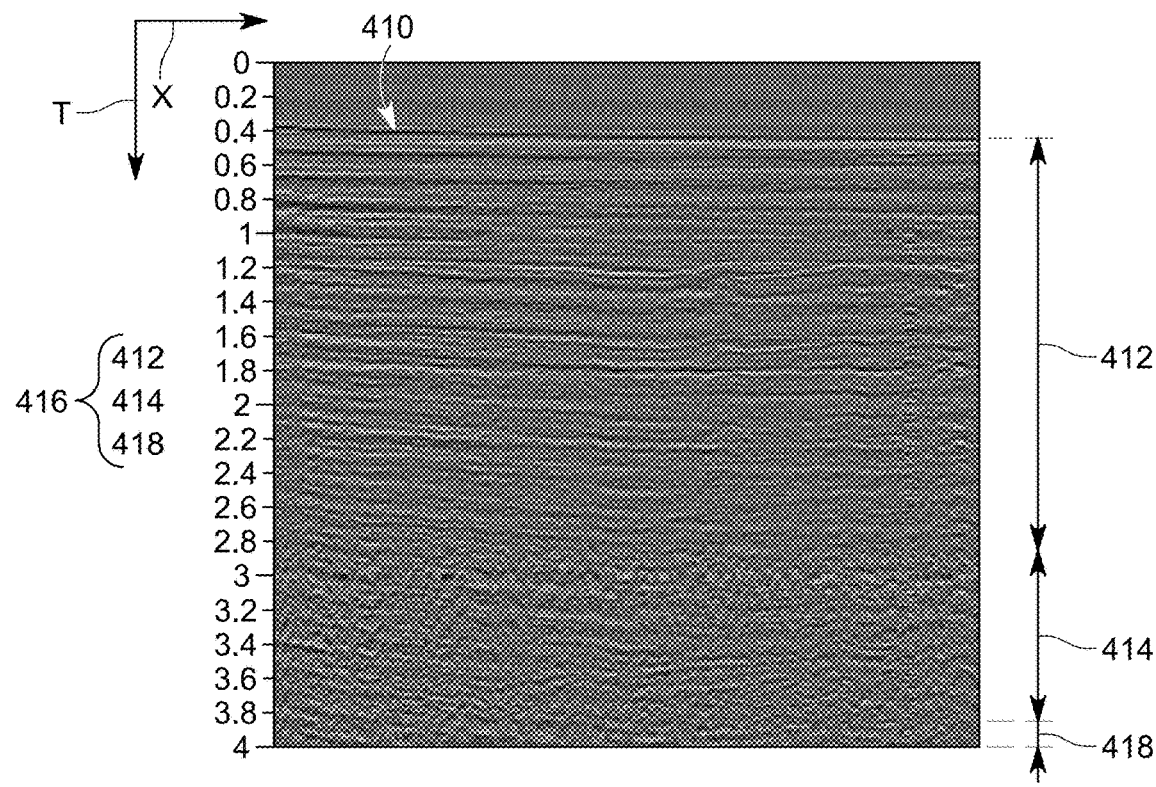
FIGS. 9A and 9B illustrate the common channel for the two sources shown in FIG. 5, with the traces from one source having a longer uncontaminated recording time length than the traces from the other source due to the different lags, and with additional random timing dither added to each source.
Figure 9B:
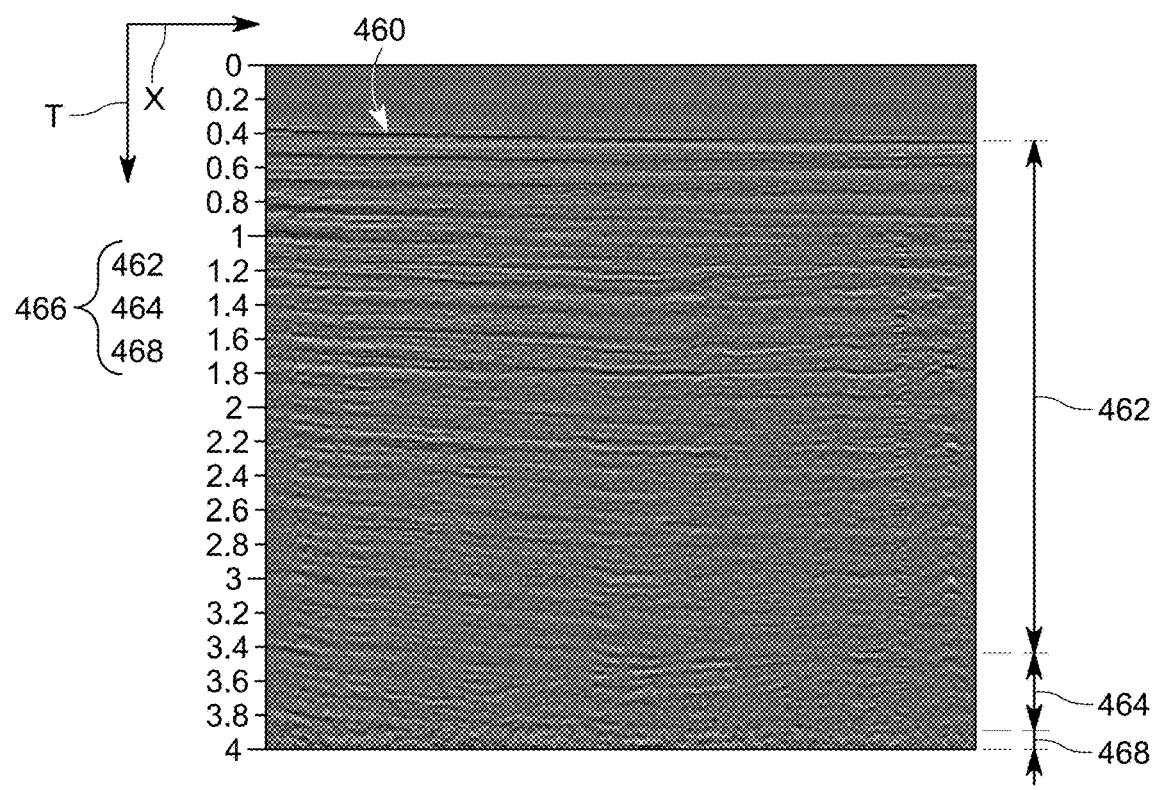

In practice, vessel speeds and water currents change continuously, and the nominal shooting rate naturally varies, maybe in the range of an additional plus-or-minus 50 ms or 100 ms. FIGS. 9A and 9B illustrate this case, with time lags similar to the case shown in FIGS. 6A and 6B, but where additional random timings RT1 and RT2 have been added to the actuation times for the first source S1 and the second source S2, which results in a random part 418 for trace 416 and a random part 468 for trace 466. The random timings may alternatively be used for every second shot actuation (i.e., just one of the sources in this example). In the case additional random shifts are used, and these are smaller than the lag times. In one application, the additional random shifts are at least five times smaller than the lag times. For example, a random shift of +/−200 ms may be used with a lag of 1 second. The additional random timings may reduce the substantially uncontaminated recording time length when looking at the common channel data for one shotpoint subset (for example, the cross-talk parts 414 and 464 in FIGS. 9A and 9B arrive earlier for some shots and later for other shots, relative to the case of FIGS. 6A and 6B). In this case, the substantially uncontaminated recording time lengths 412 and 462 may be reduced by up to two-times the maximum random delay. For the case that every second shot is delayed, the substantially uncontaminated recording time lengths may be reduced by one-times the maximum random delay.

All the features discussed in the previous embodiments may be extended to a system that uses more than two sources. For example, in a three-source setup, shotpoint subsets may be defined for each source. In this case, a different lag may be applied to each source, for example, the first source may have lag A, the second source may have lag B, and the third source may have lag C, where A, B, and C are different from each other. Note that a source in this context is understood to be a source array that has plural source elements (e.g., air guns), and the lags discussed above apply to the entire source, i.e., to all source elements that form a given source.

If using a nominal shooting rate N, and assuming the sources fire according to the sequence first source, second source, third source and repeat, the substantially uncontaminated recording time lengths for each source may be determined based on the previous source and following lag values:

Source 1: N−A+B,
Source 2: N−B+C, and
Source 3: N−C+A.

The lags for this three-source example may be designed so that the uncontaminated recording time for each source is different, or so that the uncontaminated recording times for two sources is the same and the third one is different. This approach may be extended to any number of sources. The sources may be towed at any separation in the cross-line y-direction. Large y-separation may change the arrival times of the main signal and cross-talk noise. This may be taken into account based on direct-arrival arrival times from different source positions. The sources may all be towed by the same vessel or may be towed by different vessels. There may be different shotpoint subsets for different sources, or different shotpoint subsets for shots from the same source. Lags may be positive, negative, or zero.

Figure 10A:
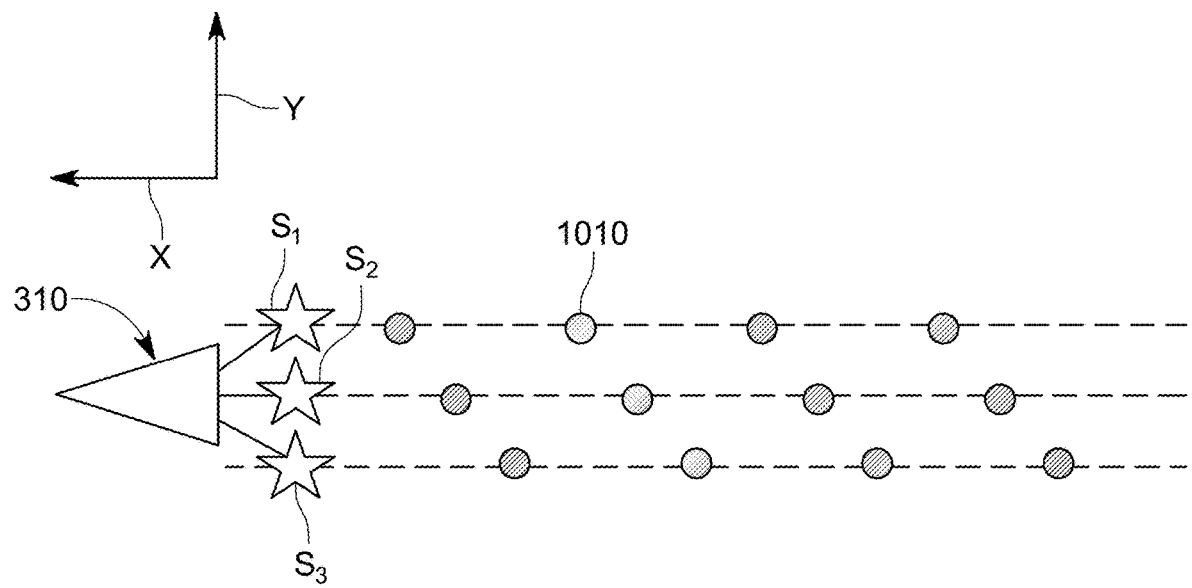
Figure 10B:
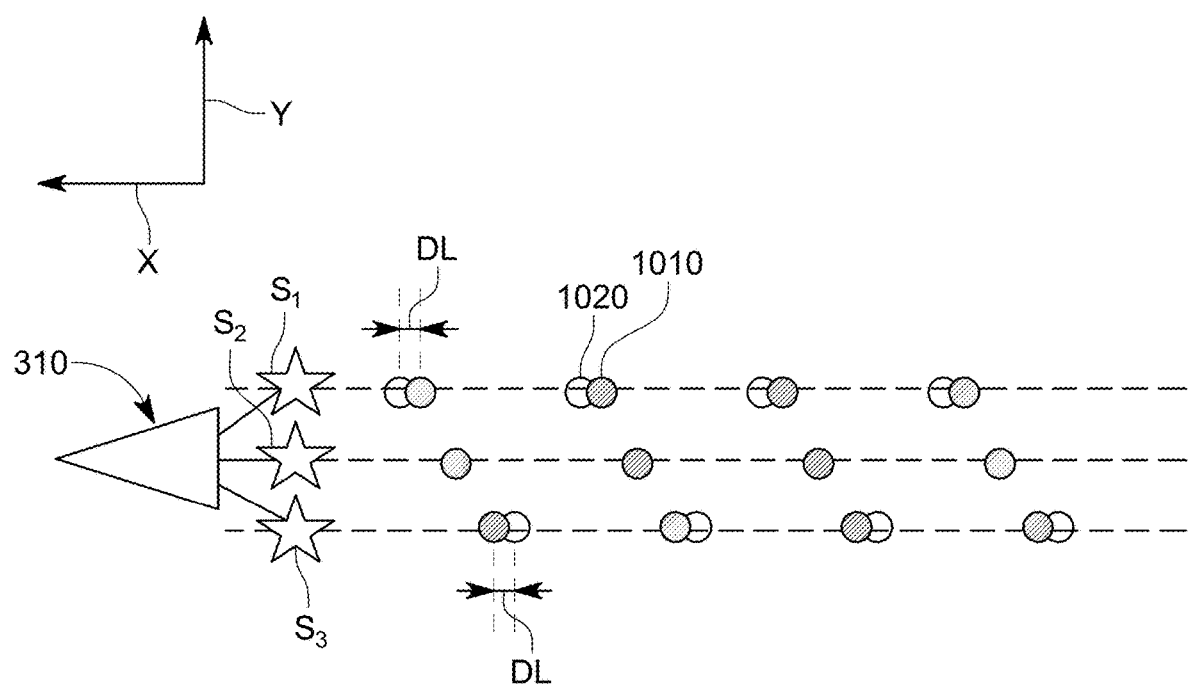
FIG. 10B illustrates misplaced preplot positions for the same marine acquisition system, for achieving different lags for the sources.

While the embodiments discussed above have described the use of temporal lags for different shotpoint subsets, in another embodiment, spatial lags may be used instead of temporal lags for different shotpoint subsets. For example, for a constant vessel speed, moving shotpoint subset preplot positions in the direction the vessel is travelling would be equivalent to negative temporal lags, or moving shotpoint subset preplot positions in a direction opposite to that the vessel is travelling would be equivalent to positive temporal lags. In this regard, FIGS. 10A and 10B compare regular preplot positions 1010 (see the full circles in the figures) with preplot positions 1020 that have been mispositioned (see the empty circles in the figures) in an attempt to actuate the first source S1 earlier than it would regularly fire, and the third source S3 to fire later than it would regularly fire. Thus, FIG. 10B shows the mispositioned preplot positions 1020 as compared to the regular plot positions 1010. Note that in this example, the preplot positions for the second source S2 have not been changed. The distance lag DL between the regular plot positions 1010 and the mispositioned preplot positions 1020, when divided to the speed of the vessel, results in the time lags A, B, and C discussed in the previous embodiments. In practice, crabbing and other positional inaccuracies may generate additional shooting delays which may be taken into account.

Figure 11:
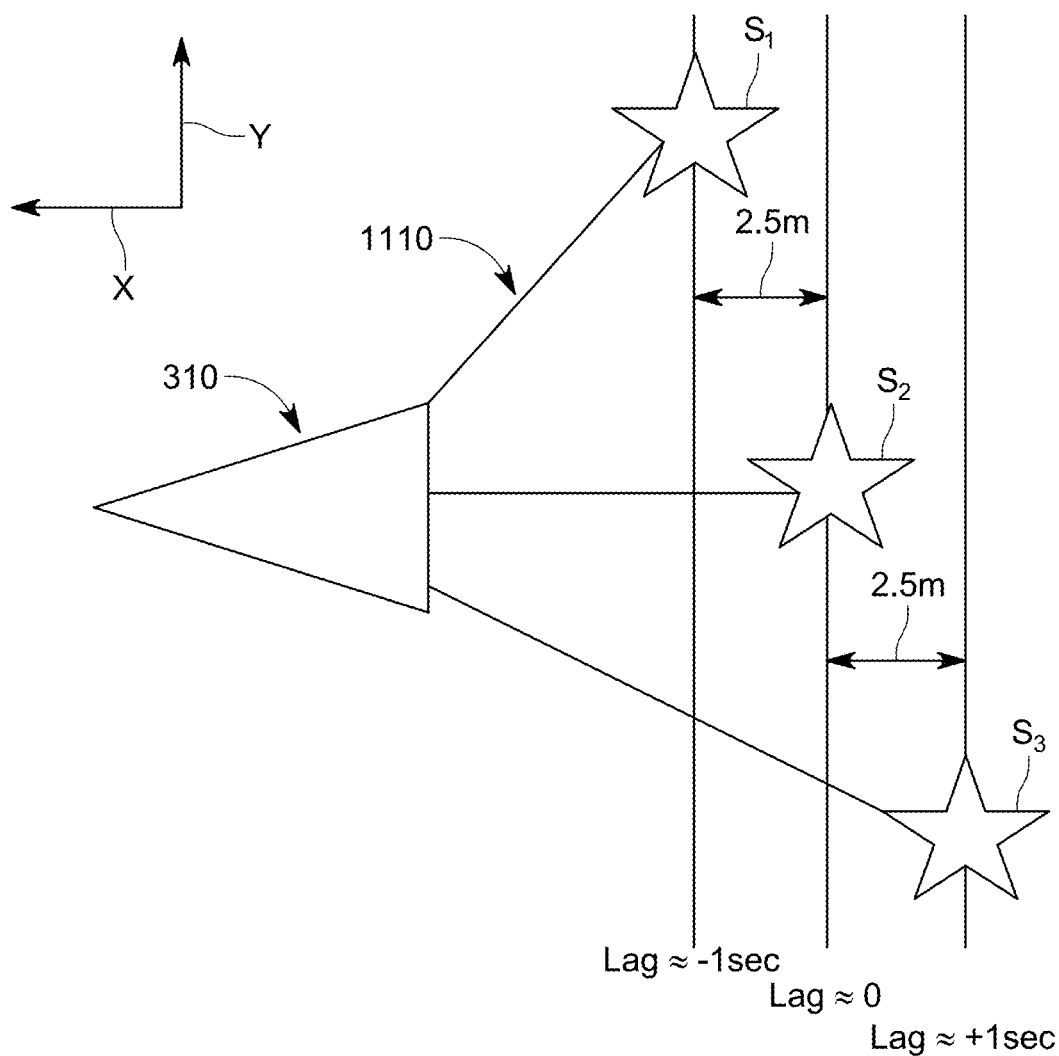
FIG. 11 illustrates a marine acquisition system for which the rigging of the sources has been altered so that the sources are differently offset along the inline direction, to achieve different lags.

The use of temporal or spatial lags may result in non-optimal shotpoint positions. For example, a lag of 1 second with a 2.5 m/s boat speed may result in a 2.5 m mispositioning of a shotpoint relative to the preplot position. In another embodiment, regular preplot positions 1010 (see FIG. 10A) with no shotpoint subset lags may be used, but instead the source rigging 1110 is modified so as to position some sources closer to the vessel and other sources further from the vessel. FIG. 11 shows such a layout, where S1 is positioned 2.5 m closer to the vessel 310, and S3 is positioned 2.5 m further away from the vessel 310 when compared with source S2. Note that this positioning is achieved by configuring the rigging 1110 to have different lengths for each source. As source S1 reaches its preplot position 2.5 m earlier, assuming a boat speed of 2.5 m/s, it may fire 1 second early. Since source S3 reaches its preplot position 2.5 m late, it may fire 1 second late. In practice, crabbing and other positional inaccuracies may generate additional shooting delays which may make this approach erroneous. In another embodiment, the sources may be deployed in a conventional configuration, but the location of each shot may be modified to include a bias in the shooting direction, e.g., GPS-position+2.5 m in the x-direction.

In yet another embodiment, sources may be actuated purely on time. For this embodiment, a predefined source actuation timing is defined in advance, with no preplot positions. Firing on time guarantees the timing of cross-talk of the following actuation, but the shotpoint firing position in space may then be varied. Varying vessel speeds for this embodiment results in irregular shotpoint actuation positions in space. For example, the shotpoint spacing may be increased if the vessel's speed increases, and shotpoint spacing may be reduced if the vessel's speed decreases. This variable shotpoint spacing may cause problems for the processing stage. For example, formation of 2D receiver gathers for 2D CMP gathers may be challenging/erroneous, or spacings along a common channel display may be variable.

In another embodiment, a combination of two or more of the following may be used: (1) shotpoint subset timing lags, (2) shotpoint subset preplot repositioning, as illustrated in FIGS. 10A and 10B, and/or (3) modified source rigging to reposition the sources, as illustrated in FIG. 11.

Once the seismic data has been acquired based on one of the embodiments discussed above, there are several approaches for processing such data, where the cross-talk noise from the following shot arrives at different times for different shotpoint subgroups. Note that the term "subgroup" used for the processing stage is different from the term "subset" used for the acquisition stage above. Previously, the term "shotpoint subsets" related to a selection of shotpoints from one, two or more sources, where the selected shotpoints substantially shared the same lag. The term "subgroup" here relates to groups of shotpoints which are all uncontaminated up to a given two-way time. Referring back to FIGS. 6A and 6B, the traces generated by the first source S1 may relate to a first subset of shotpoint SS1 (see FIG. 6A), and the second source S2 may relate to a second subset of shotpoints SS2 (see FIG. 6B). Each subset has a different lag. However, subgroup SG1 according to a processing embodiment may contain data from subset SS1 and subset SS2, as shown in FIGS. 6A and 6B, and the traces in SG1 are uncontaminated by cross-talk noise up to 2.8 seconds. Subgroup SG2 may consist only of shotpoints from subset SS2, as only subgroup SG2 traces 466 are uncontaminated up to 3.8 seconds. In general, all shotpoint subsets may form one subgroup for the shallow section, with other subgroups forming traces with longer recording times free from contamination.

Figure 12:
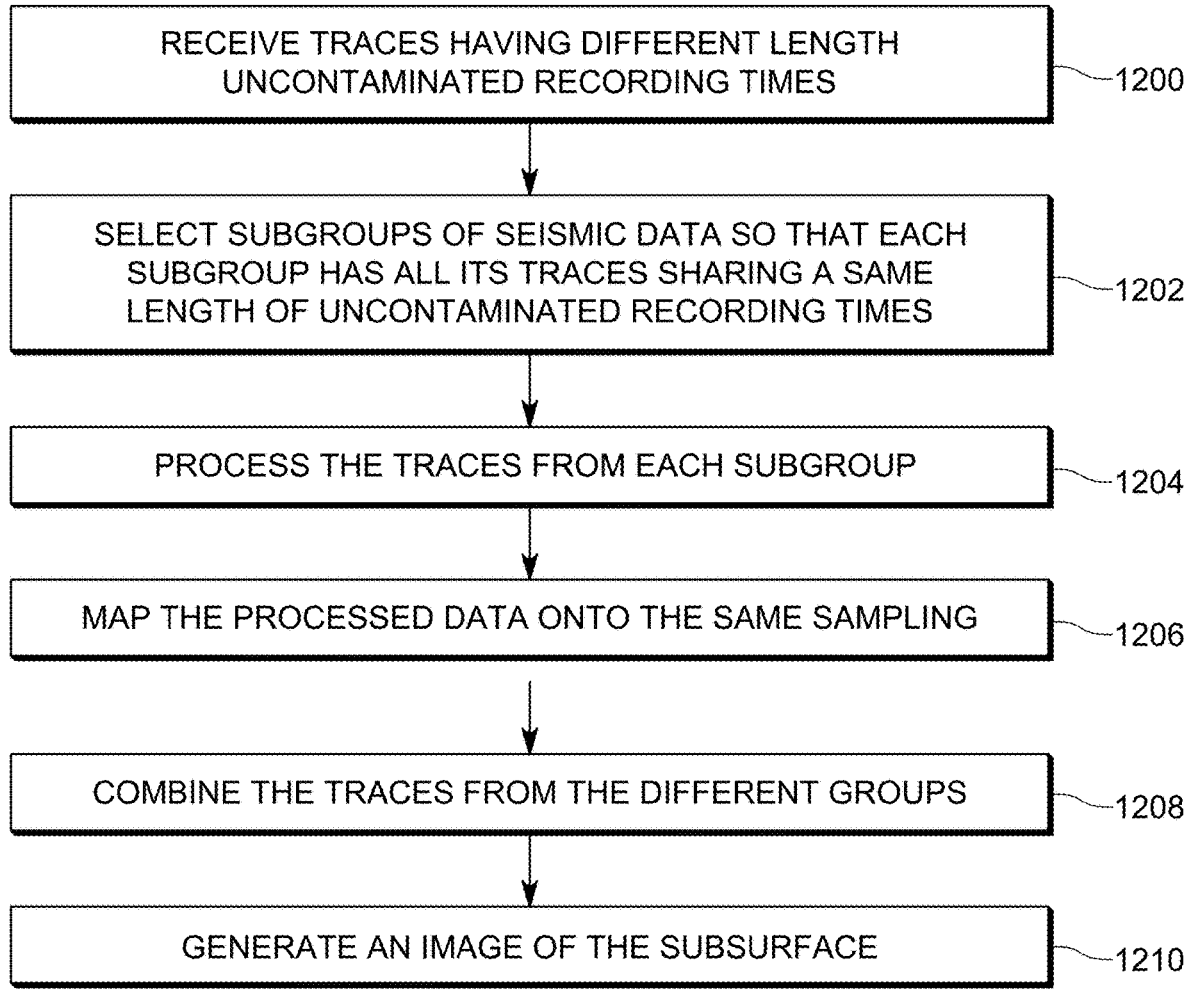
FIG. 12 is a flow chart of a method for combining data from different shotpoint subgroups for generating an image of the subsurface.

Having generated seismic waves with different lags and having recorded seismic signals with different uncontaminated recorded time lengths, there is a need to now process this data. According to a first processing method, which is schematically illustrated in FIG. 12, the seismic data from different shotpoint subgroups is combined. More specifically, in step 1200, seismic data is received or acquired so that recorded traces correspond to at least two subsets of shotpoints, a first subset having a first lag, and the second subset having a second lag, different from the first lag, as discussed above with regard to FIGS. 6A and 6B. The recorded traces corresponding to the first subset have a first length for the uncontaminated recording times, while the recorded traces corresponding to the second subset have a second length for the uncontaminated recording times, different from the first length.

In step 1202, two or more subgroups SG1, SG2 of data are selected so that the traces from each group share the same length of uncontaminated recording time. In one implementation, as illustrated in FIGS. 6A and 6B, the first subgroup SG1 may include traces corresponding to both sources S1 and S2, e.g., up to 2.8 s, and a second subgroup SG2 may include traces corresponding only to the second source S2, for example, see FIG. 6B, up to 3.8 s. Other groups or times may be selected as long as each group share the same uncontaminated recoding time length. In one application, the subgroup includes traces corresponding only to a given length along the inline direction in FIGS. 6A and 6B.

Figure 8:
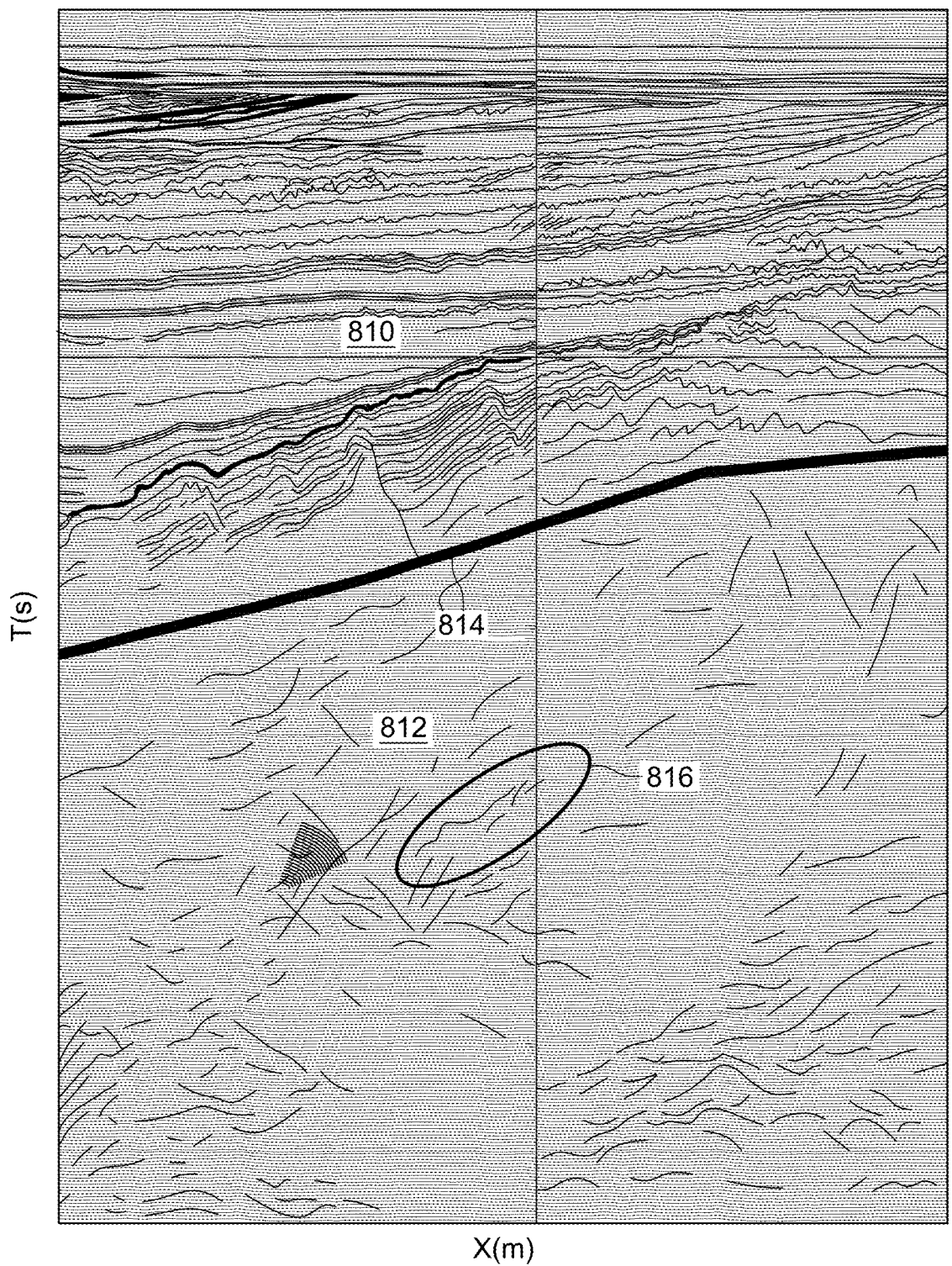
FIG. 8 illustrates how a border between shallow and deep portions of the explored area changes in depth along an inline direction.

In step 1204, the traces from each subgroup are processed independent of the other subgroups to remove, for example, swell noise, free-surface ghosts, multiples, etc. Alternatively the subgroups may be partially processed together, for example convolutions of data from SG1 with SG2 will be required to produce short period multiple predictions for SG2. Alternatively, processing of one subgroup may be used as input to a processing step of another subgroup, for example a multiple prediction using data from SG1 may be used to attenuate multiples from SG2. Any known processing algorithm may be applied to these subgroups. In step 1206, the processed seismic data from the different subgroups is mapped onto the same sampling, for example, (1) regularize all subgroups onto the same trace positions (e.g. midpoint positions), or (2) migrate the data, outputting onto the same grid. In step 1208, a first time or depth range of traces from the first subgroup SG1 are combined with a second time or depth range of traces from the second subgroup SG2, and in step 1210, the combined traces are used to generate an image of the subsurface, for example, as shown in FIG. 8. In practice an overlap in time may be used between the subgroups, for example in the range of 500 ms. The image generated by the method illustrated in FIG. 12 is then used for exploration purposes, for example, to select where to drill a well for reaching a desired resource. Such method reduces the chances that the drilled well misses the resource due to the high accuracy introduced by the lagging traces.

Figures 13A, 13B:
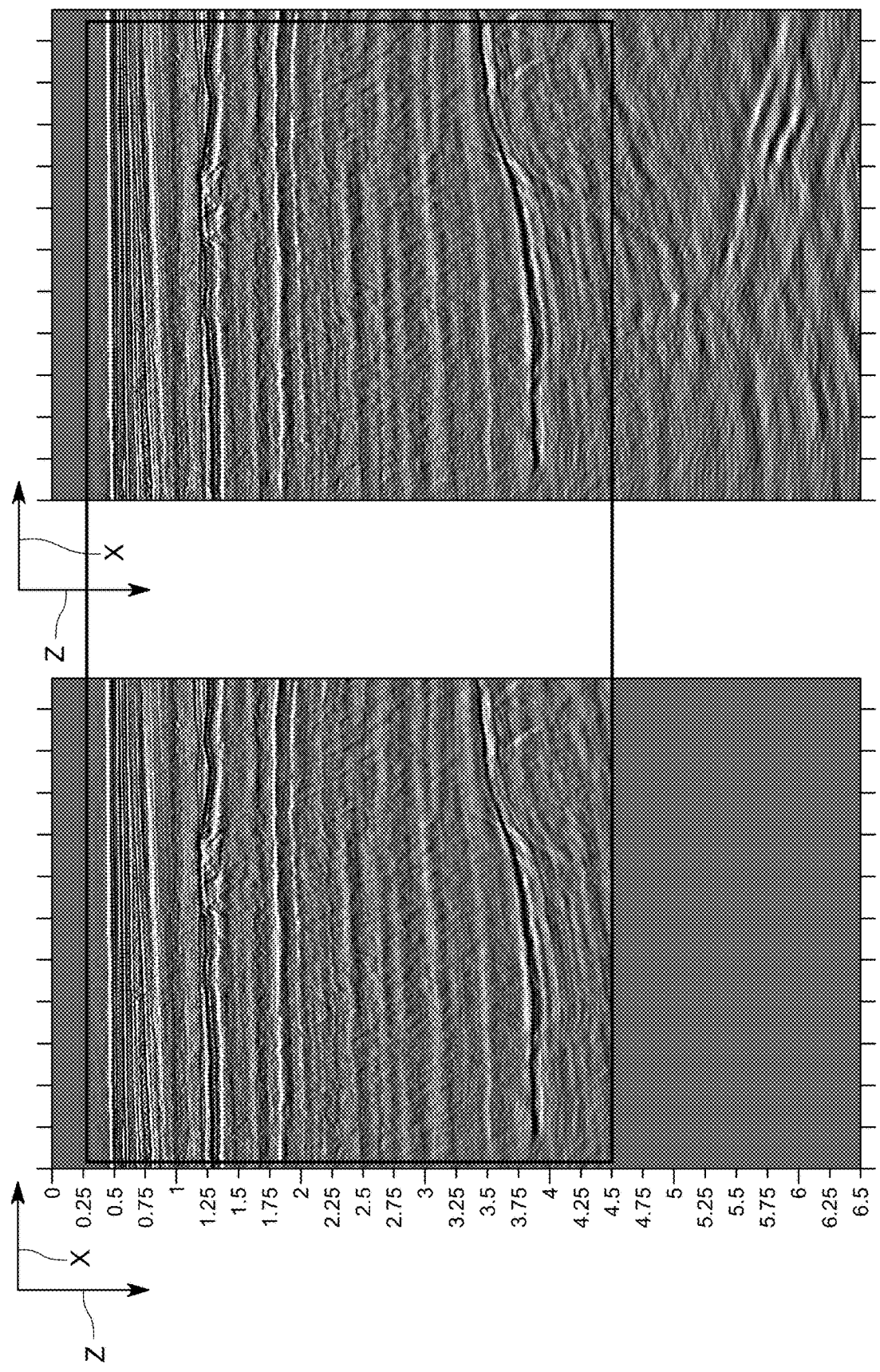
Figure 14:
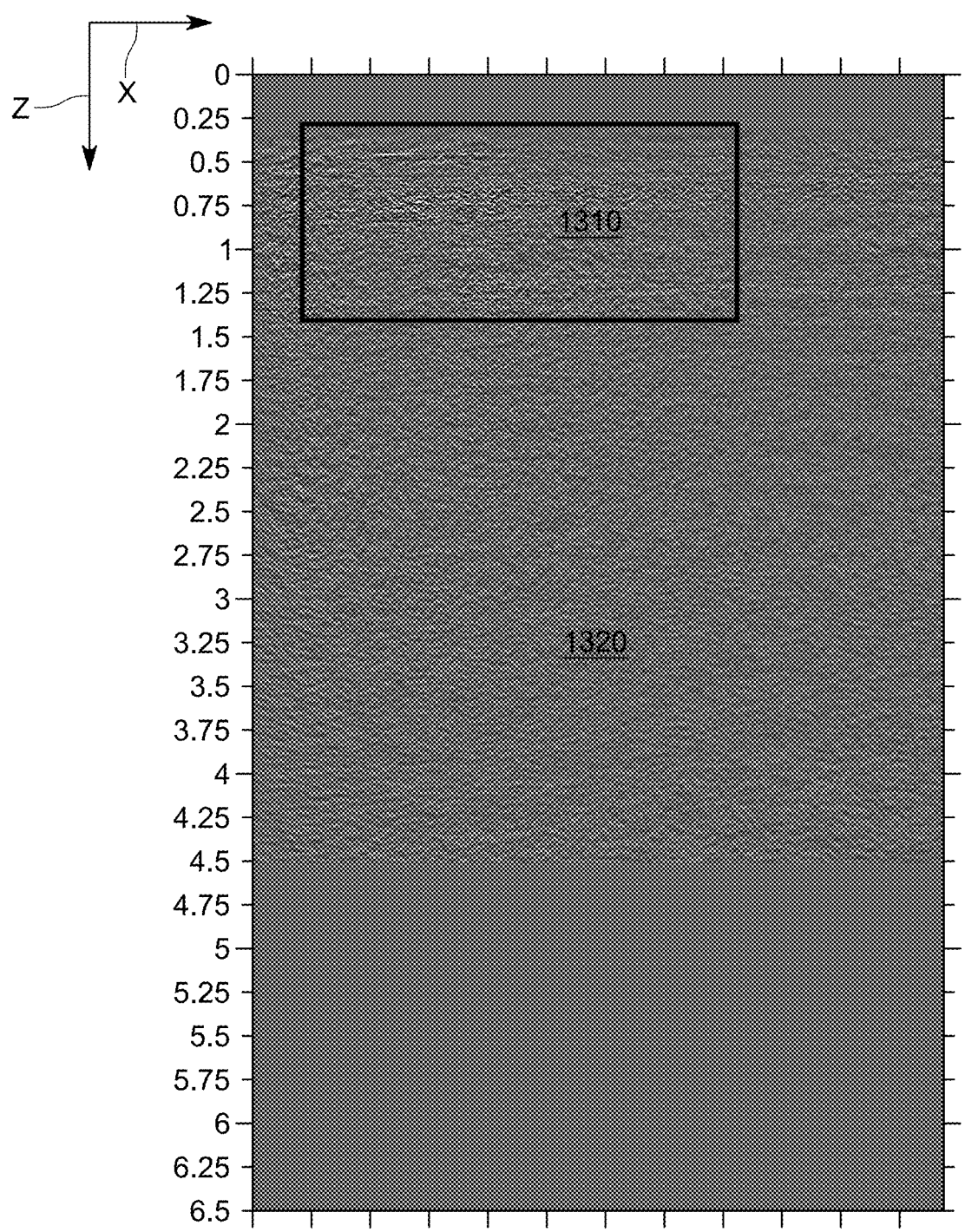
FIG. 14 shows a difference between the data in FIGS. 13A and 13B, corresponding to the shallow section.

FIGS. 13A and 13B show an example of a dual source decimation test relating to the method of FIG. 12. More specifically, FIG. 13A shows a dual source (S1 and S2) regularization and migration for 4.5 second trace length while FIG. 13B shows a single source (e.g., S1) regularization and migration for 6.5 second trace length. FIG. 14 is the result of the difference between the features shown in shallow section of FIG. 13A and the features shown in the shallow section of FIG. 13B. The data for the single source only was regularized onto the same bin size as the dual source case. The data in FIGS. 13A and 13B is presented after time migration.

It is noted that in the shallow section 1310 there are some differences in the imaging, as the coarser shotpoint sampling has degraded some of the details. In the deeper section 1320 the results are more similar. It is well known that for data at large recording times, the wavefield curvature is smaller and the frequency content of the data is lower, and for these reasons data does not need to be sampled as densely as data at smaller recording times. This is the same principle used for towing streamers more coarsely at longer offsets than at shorter offsets (fanning). The imaging results shown in FIGS. 13A and 13B could be combined to create a composite image in the shallow region, from the first shotpoint subgroup SG1, and in the deep region from the second shotpoint subgroup SG2. In this case, the second shotpoint subgroup may be more coarsely sampled than the first shotpoint subgroup. In one application, there may be an overlap/taper where the two results are joined. Note that the same results may be obtained if other shotpoint subgroups are selected. In other words, any two subgroups may be selected as the SG1 and SG2, and not only those introduced in FIGS. 6A and 6B.

Figure 15:
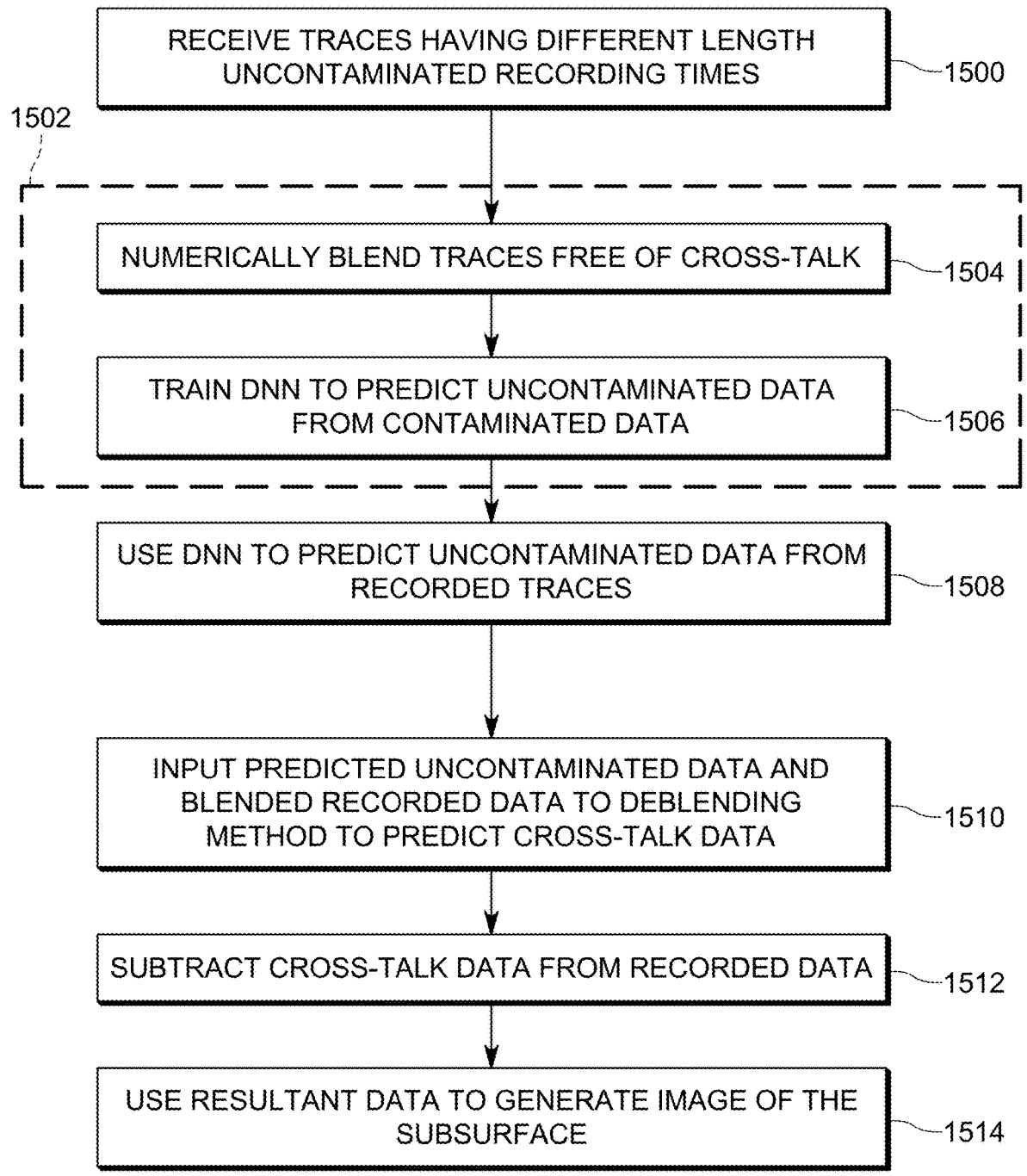
FIG. 15 is a flow chart of a method for deblending the seismic data acquired with different lags.

According to a second processing method, it is possible to deblend the recorded seismic data. This method involves deblending to remove cross-talk from one or more shotpoint subsets. In some cases, cross-talk for all shotpoint subsets may be removed. After removing cross-talk, data from different shotpoint subsets may be combined for further processing, for example, as discussed above with regard to FIG. 12. The deblending may involve using seismic data in an uncontaminated recording time (unblended) to help separate contaminated (blended) data. In one application, as illustrated in FIG. 15, the method starts with a step 1500 of acquiring or receiving seismic data so that the recorded traces correspond to at least two subsets of shotpoints, a first subset having a first lag, and a second subset having a second lag, different from the first lag, as discussed above with regard to FIGS. 6A and 6B. The recorded traces corresponding to the first subset have a first length for the uncontaminated recoding times, while the recorded traces corresponding to the second subset have a second length for the uncontaminated recording times, different from the first length.

In step 1502, the method trains a deep neural network (DNN) using numerical blending of data in a first shotpoint subgroup SG1 to deblend data in a second shotpoint subgroup SG2. In step 1504, the method numerically blends data free of cross-talk (e.g., by contaminating deep uncontaminated data for the second source S2 data in FIG. 6B). This means that the contamination does not naturally occur, but it is generated by the computer to blend the data. The numerical blending is done by the computer by adding cross-talk to the uncontaminated data. In step 1506, the computer trains a DNN network to predict uncontaminated data from the contaminated data calculated in step 1504. In step 1508, the DNN is used to predict uncontaminated data from contaminated data for first source S1 (see FIG. 6A). In one embodiment, if the uncontaminated data from step 1508 is accurate, it can be used directly to generate an image of the subsurface. Alternatively, based on this training, the method may optionally advance to step 1510, where the blended and unblended data (e.g., data from different shotpoint subsets) is input into a deblending method. Any deblending method may be used, for example, an inversion-based 3D deblending using sparse TauP and wavelet transforms as discussed in [3] or a simultaneous source separation by sparse Radon transform as discussed in [4]. Other deblending algorithms may be used. The DNN may be trained to predict one of cross-talk noise or cross-talk free data from an input including blended data, based on the methods discussed in [5] and [6]. In step 1512, a prediction of the cross-talk may be subtracted from the acquired blended data to obtain cross-talk free data, and in step 1514 the cross-talk free data is used to generate an image of the subsurface.

The inclusion of non-blended data to a deblending algorithm may help cross-talk separation from the desired signal. For example, inversion based methods such as those discussed in [4] involve the derivation of a model domain which when reverse transformed and re-blended results in the blended data. Unblended input data may constrain the inversion step. In one embodiment the non-blended data may be transformed to a model domain, and the strongest signal components may be identified, for example using the envelope of the model domain or by sorting the absolute amplitude of the model domain from high amplitude to low amplitude. The analysis of the model domain of the non-blended data may be used as a guide for deblending the blended data, for example using the envelope of the non-blended data as sparseness weights for deblending of the blended data. In another embodiment, the unblended traces may be given increased importance by using data domain sparseness weights. An alternative approach based on modified Radon operators as discussed in [7] uses a tau-p matching pursuit method where trace segments are given confidence weights based on cross-talk contamination levels. Matching pursuit approaches begin with decomposing the strongest model components and working to the weakest model components. In one embodiment, the non-blended data may be used to determine the decomposition order for the matching pursuit of the blended data. This may include transforming the non-blended data to a model domain, sorting the model coefficients from strongest to weakest, and decompositing the blended data using the model coefficient order from the non-blended data.

Figure 16:
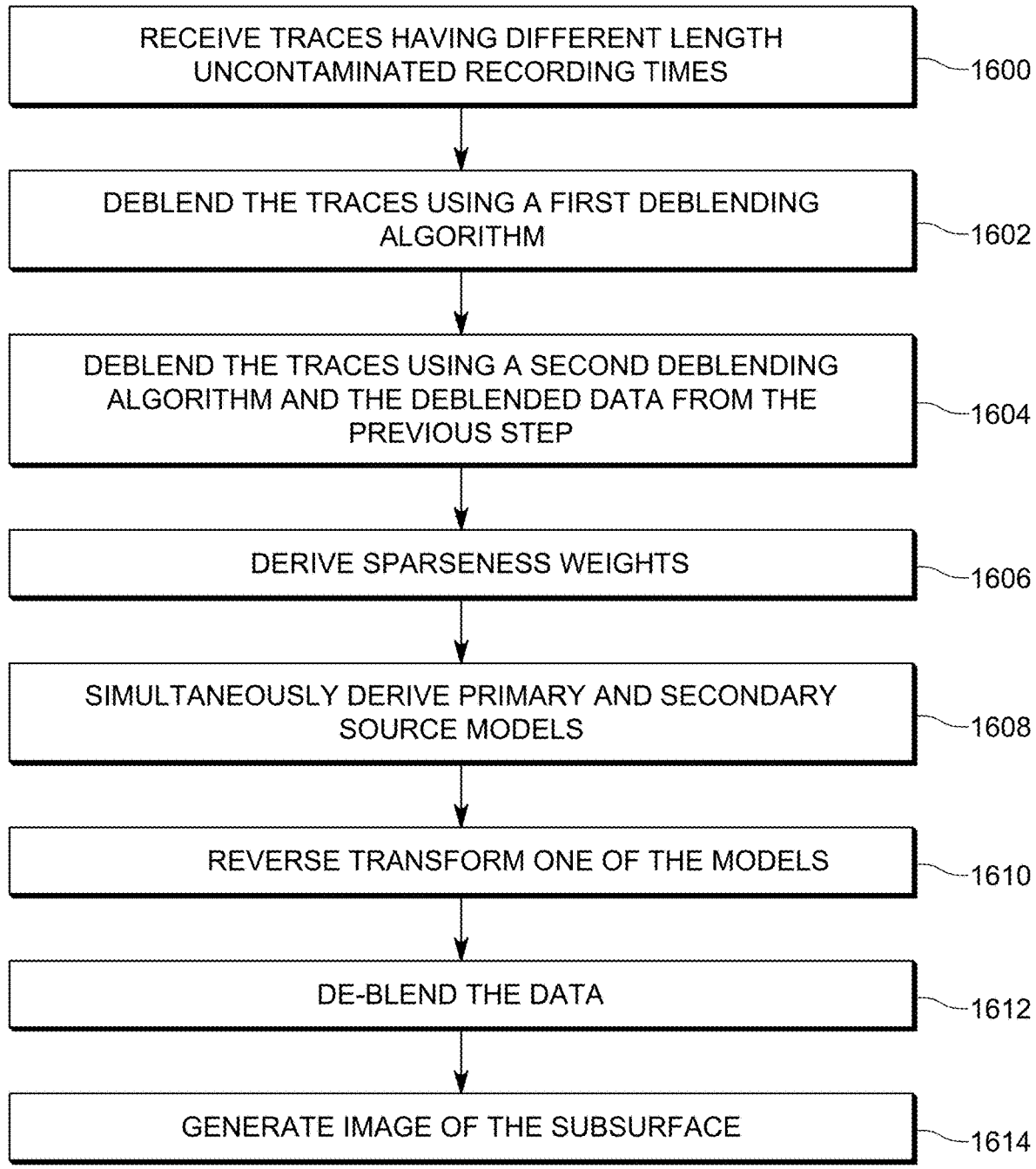
FIG. 16 is a flow chart of a method for guided deblending of seismic data acquired with different lags.

According to a third processing method discussed with regard to FIG. 16, it is possible to receive in step 1600 the recorded seismic data (for example, the recorded seismic data acquired with different lengths for the uncontaminated recording times discussed in step 1200 or 1500 above), deblend in step 1602 the seismic data acquired with substantially the same uncontaminated recording time, by a first deblending approach, and then use in step 1604 this data as prior knowledge for a second deblending approach. This process is called herein guided deblending. For example, the first deblending approach may be the DNN deblending discussed above with regard to FIG. 15, and the second deblending approach may be a least-squares deblending approach. Another option is that the first deblending approach may be a least-squares deblending approach, and the second deblending approach may be a matching-pursuit deblending approach. Other combinations of deblending methods may be used.

In one embodiment, the DNN deblended data from step 1602 is derived as discussed in steps 1606-1612. More specifically, in step 1606, sparseness weights are derived as discussed in [4]. The approach of [4] involves a step 1608 of simultaneously deriving models for primary and secondary sources, a step 1610 of reverse transforming one of the models to a space-time domain, and de-blending in step 1612 the data. This approach is described by equation (5) from [4], which is given below as:

$$[L_p | SL_s]\begin{bmatrix} \hat{m}_p \\ \hat{m}_s \end{bmatrix} \approx d.$$

In this equation, the taup models for the primary and secondary sources ($\hat{m}_p$ and $\hat{m}_s$) are found by inversion, such that when transformed back to a space-time domain through linear operators $L_p$ and $L_s$, time shifts are applied using matrix S, and the results sum to equal the recorded (blended) data, d. As described by equation (2) of [4], model domain sparseness weights are used to constrain the inversion as follow:

$$J(m) = \|Lm - d\|_2 + \lambda \|m\|_1.$$

As described in [4], the model domain sparseness weights were derived by iteratively re-weighted least squares inversion. In one embodiment, the model domain sparseness weights may be defined by the envelope of the signal from the model domain of the non-blended data. Once the models have been found, it is possible to reverse transform one of the models to generate an estimate of cross-talk noise, which may be subtracted from the input data.

In one embodiment, the model domain sparseness weights for the inverse problem may be derived from the result of a previous deblending, using a method which is not based on inversion. The method may be a matching-pursuit based approach as discussed in [7], a method based on DNN deblending as discussed in [5], or another deblending approach. The DNN approach may follow the method discussed with regard to FIG. 15 above. The signal model in a space-time domain resulting from the previous deblending result may be transformed into the model domain (in the case of [4], this may be the taup domain, but other domains such as the wavelet transform domain described by [3] may be used). Once transformed to the model domain, the envelope of the signal may be calculated, and used as model domain sparseness weights $\lambda \|m\|_1$, in the linear equation. Other approaches using the previously deblended data to derive sparseness weights may be used. Based on the deblended data, and optionally on the derived sparseness weights, an image of the subsurface is generated in step 1614.

In yet another embodiment, the previously deblended data could be used to select a model parameter for denoise or matching pursuit based deblending, for example following [7]. The previously deblended data from step 1602 may be from a DNN approach (e.g., following [6]), or an inversion based method (such as [4] or [3]). This embodiment may involve transforming the blended data and the previously deblended data from the space-time domain to a model domain. Picking a model parameter (e.g., taup slowness and tau timing) based on the transformed previously deblended data, and modelling a signal based on the same model parameter from the transformed blended data. In another embodiment, non-blended data may be used to select a model parameter for denoise or matching pursuit deblending of blended data.

Figure 17:
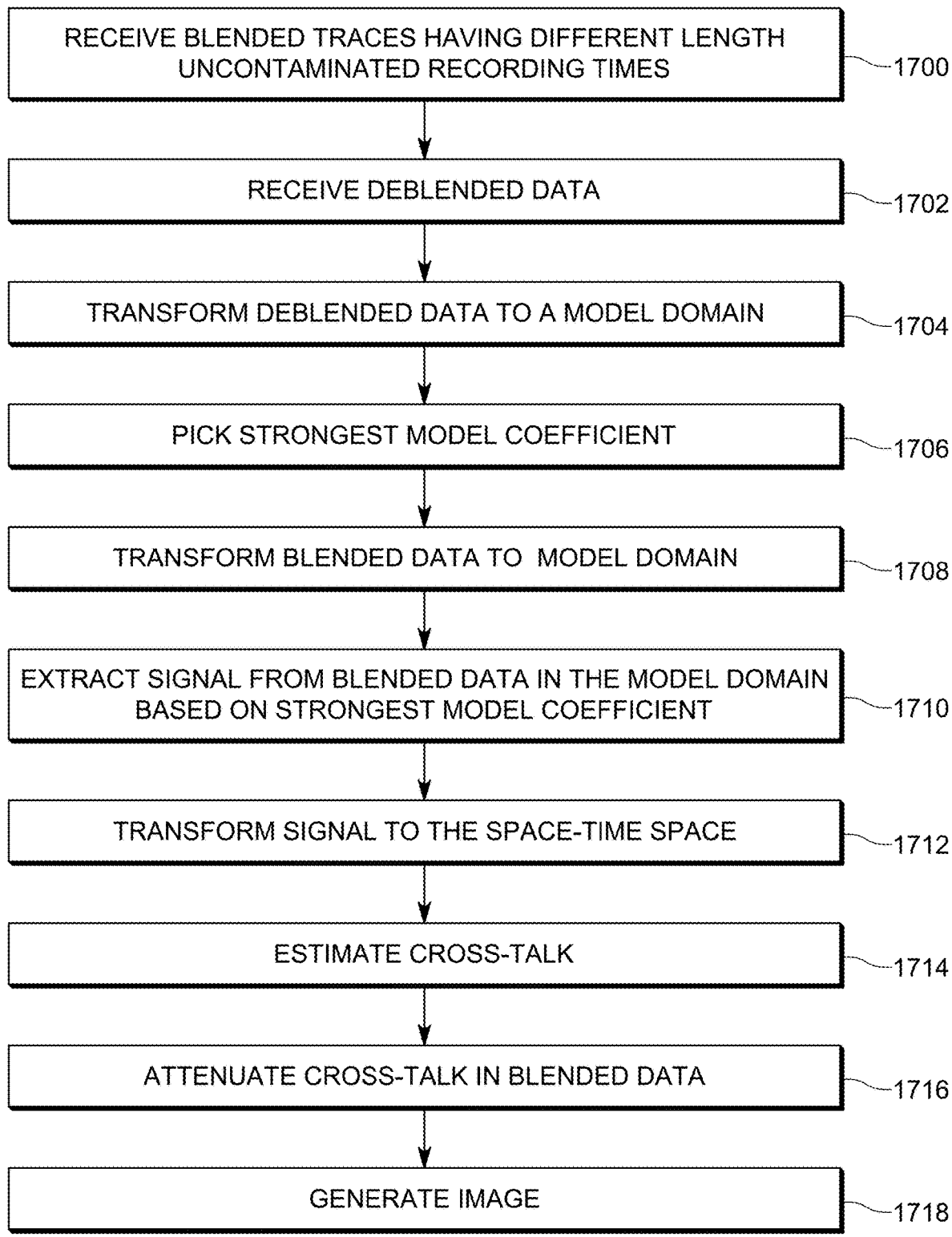
FIG. 17 is a flow chart of a method for deblending the seismic data acquired with different lags by using a model parameter.

For example, this method, which is illustrated in FIG. 17, may include a step 1700 of acquiring or receiving blended seismic data so that the recorded traces correspond to at least two subsets of shotpoints, a first subset having a first lag, and a second subset having a second lag, different from the first lag, as discussed above with regard to FIGS. 6A and 6B. The recorded traces corresponding to the first subset have a first length for the uncontaminated recording times, while the recorded traces corresponding to the second subset have a second length for the uncontaminated recording times, different from the first length.

The method further includes a step 1702 of receiving the previously deblended data (from step 1602 in the method discussed with regard to FIG. 16) in a space-time domain, a step 1704 of transforming the previously deblended data to a model domain (e.g., taup domain), a step 1706 of picking the strongest model coefficient, a step 1708 of transforming the blended data from step 1700 to a model domain (e.g., taup domain), a step 1710 of extracting a signal from the data from step 1708 corresponding to the strongest model coefficient picked in step 1706, a step 1712 of transforming the signal component in step 1710 from the model domain to the space-time domain, a step 1714 of sorting the signal component from step 1712 to estimate cross-talk noise (e.g., time-shift), a step 1716 of using the cross-talk noise from step 1714 to attenuate the cross-talk noise in the blended data from step 1700, and a step 1718 of generating an image of the subsurface based on the attenuated cross-talk noise data obtained in step 1716.

Figure 18:
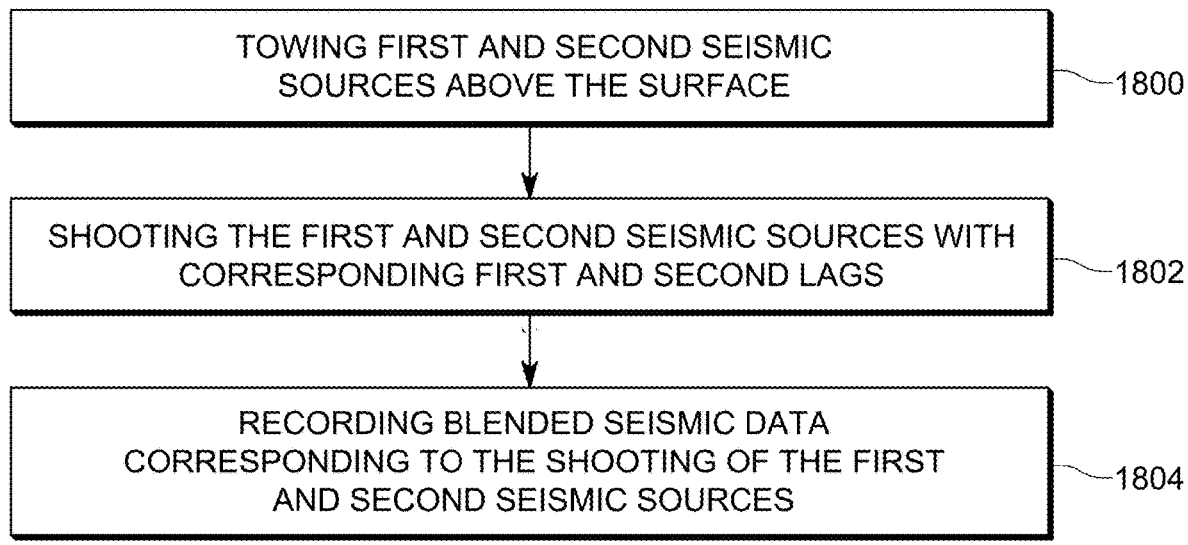
FIG. 18 is a flow chart of a method for acquiring seismic data with lagged shooting.

The above processing methods may be used with blended data acquired as now discussed with regard to FIG. 18. The method includes a step 1800 of towing first and second seismic sources S1, S2 above the subsurface, a step 1802 of shooting the first and second seismic sources S1, S2 with corresponding first and second lags, L1 and L2, respectively, relative to pre-determined shotpoints, wherein the first lag L1 is different from the second lag L2, and a step 1804 of recording blended seismic data corresponding to the shooting of the first and second seismic sources S1, S2. The blended seismic data includes plural traces having cross-talk free parts with different uncontaminated recording time lengths.

Figure 19:
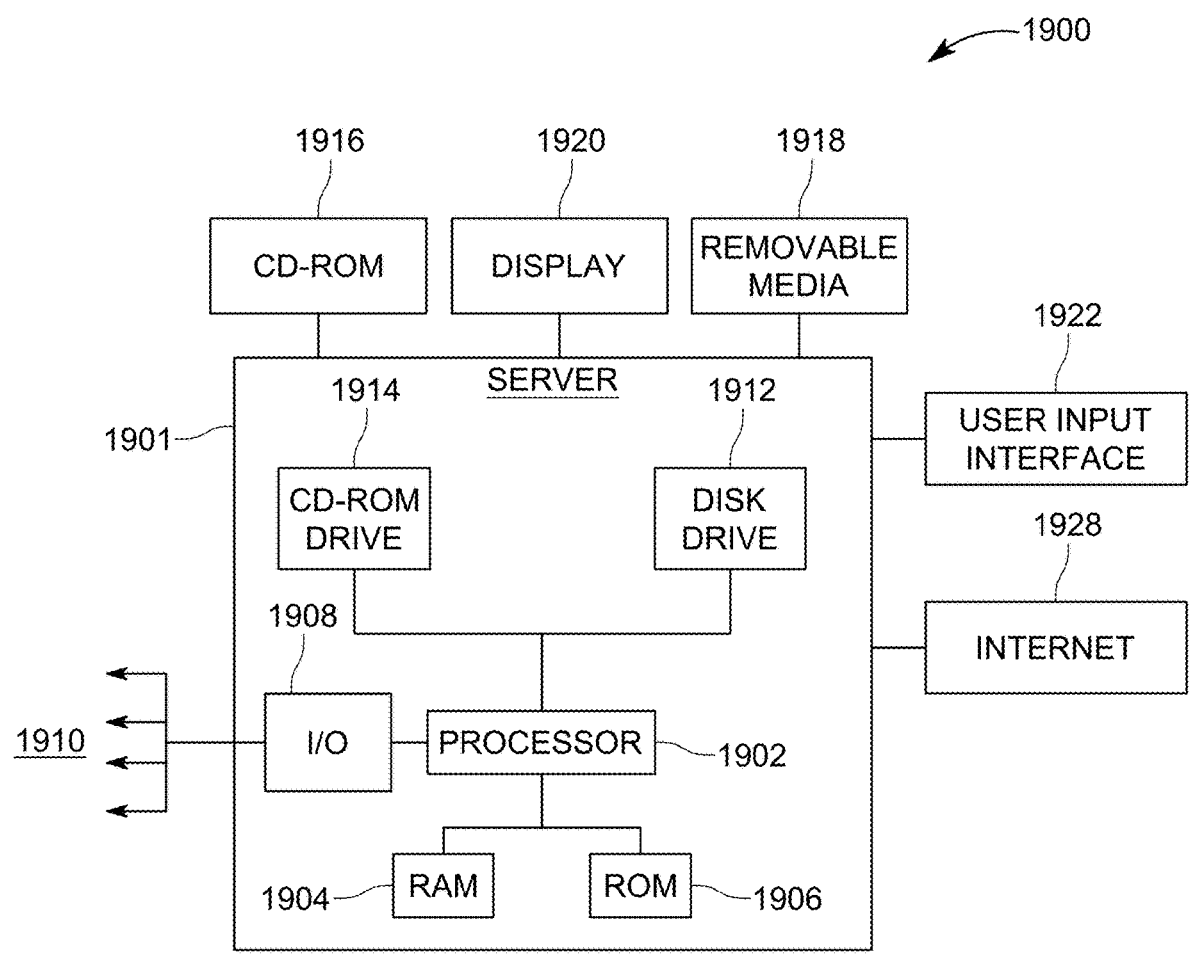
FIG. 19 is a schematic diagram of a computing device configured to perform one or more of the above-discussed methods.

The above method and others may be implemented in a computing system specifically configured to calculate the subsurface image. An example of a representative computing system capable of carrying out operations in accordance with the exemplary embodiments is illustrated in FIG. 19. Hardware, firmware, software or a combination thereof may be used to perform the various steps and operations described herein.

The computing system 1900 suitable for performing the activities described in the exemplary embodiments may include a server 1901. Such a server 1901 may include a central processor (CPU) 1902 coupled to a random access memory (RAM) 1904 and to a read-only memory (ROM) 1906. ROM 1906 may also be other types of storage media to store programs, such as programmable ROM (PROM), erasable PROM (EPROM), etc. Processor 1902 may communicate with other internal and external components through input/output (I/O) circuitry 1908 and bussing 1910, to provide control signals and the like. Processor 1902 carries out a variety of functions as are known in the art, as dictated by software and/or firmware instructions.

The server 1901 may also include one or more data storage devices, including a disk drive 1912, CD-ROM drives 1914, and other hardware capable of reading and/or storing information such as DVD, etc. In one embodiment, software for carrying out the above-discussed steps may be stored and distributed on a CD- or DVD-ROM 1916, removable memory device 1918 or other form of media capable of portably storing information. These storage media may be inserted into, and read by, devices such as the CD-ROM drive 1914, the disk drive 1912, etc. The server 1901 may be coupled to a display 1920, which may be any type of known display or presentation screen, such as LCD, LED displays, plasma displays, cathode ray tubes (CRT), etc. A user input interface 1922 is provided, including one or more user interface mechanisms such as a mouse, keyboard, microphone, touchpad, touch screen, voice-recognition system, etc.

The server 1901 may be coupled to other computing devices, such as landline and/or wireless terminals, via a network. The server may be part of a larger network configuration as in a global area network (GAN) such as the Internet 1928, which allows ultimate connection to various landline and/or mobile client devices. The computing device may be implemented on a vehicle that performs a land seismic survey, on a vessel that performs the seismic data acquisition, or in a land based server.

The disclosed exemplary embodiments provide a system and a method for recording blended seismic data, where traces of the seismic data have been recorded with different uncontaminated recording times for different subsets of shotpoints. This data is combined to generate an image of the surveyed surface, or may be used for deblending or guided deblending. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] Hegna, S., Kluver, T. and Lima, J. [2018] Benefits of continuous source and receiver side wavefields. SEG conference proceedings.
[2] Abma, R. and Ross, A. [2013] Popcorn shooting: Sparse inversion and the distribution of airgun array energy over time, SEG conference proceedings.
[3] Peng, C. and Meng, J. [2016] Inversion-based 3D deblending of towed-streamer simultaneous source data using sparse TauP and wavelet transforms. 86th Annual International Meeting, SEG, Expanded Abstracts.
[4] Akerberg, P., G. Hampson, J. Rickett, H. Martin, and J. Cole, 2008, Simultaneous source separation by sparse Radon transform: 78th Annual International Meeting, SEG, Expanded Abstracts, 2801-2805.
[5] Hou, S. and Hoeber, H. [2020] Seismic processing with deep convolution neural networks: Opportunities and challenges, EAGE conference proceedings.
[6] Sun, J., Slang, S., Elboth, T., Greiner, T. L., McDonald, S., and Gelius, L-J. [2020] A convolutional neural network approach to deblending seismic data. Geophysics, Volume 86, Issue 4.
[7] Haacke, R. R., Hampson, G, and Golebiowski, B. [2015] Simultaneous shooting for sparse OBN 4D surveys and deblending using modified Radon operators, EAGE conference proceedings.

What is claimed is:

1. A method for generating an image of a subsurface based on blended seismic data, the method comprising:
   receiving the blended seismic data, which includes first traces have a first cross-talk free portion of a first uncontaminated recording time length and second traces having a second cross-talk free portion of a second uncontaminated recording length different from the first uncontaminated recording time length and corresponding to a larger exploration depth than the first uncontaminated recording time length;
   processing the first traces and the second traces to generate first processed traces and second processed traces, respectively;
   mapping the first processed traces and the second processed traces to a same sampling;
   combining the first processed traces and the second processed traces as mapped to generate combined processed traces; and
   generating an image of a structure of the subsurface based on the combined processed traces to locate a desired resource,
   wherein the step of receiving comprises:
   acquiring the blended seismic data so that the first traces are recorded following firing one source at a first subset of shotpoints with a first time lag, and the second traces are recorded following another source at a second subset of the shotpoints with a second time lag, the second time lag being different from the first time lag.

2. The method of claim 1, wherein the processing includes attenuation of cross-talk noise from at least one of the first traces and the second traces.

3. The method of claim 1, wherein the processing includes:
   grouping a first portion of the first uncontaminated recording length with the second uncontaminated recording time length into a first group, the first portion having a length equal to the second uncontaminated recording time length; and
   grouping remainders of the first uncontaminated recording length into a second group.

4. The method of claim 1, wherein the mapping onto the same sampling includes regularizing the first processed traces and the second processed traces to same midpoint positions.

5. The method of claim 1, wherein the mapping onto the same sampling includes migrating the first processed traces and the second processed traces to onto a same grid.

6. The method of claim 1, wherein the combining includes combining a first time or depth of the first processed traces with a second time or depth of the second processed traces.

7. The method of claim 1, wherein a spatial density of the first traces is smaller than a spatial density of the second traces.

8. The method of claim 1, wherein the first and second time lags follow a predetermined curve, which varies with a geology of a surveyed surface.

9. The method of claim 1, wherein each of the first and second time lags are modified with a random time delay.

10. A method for acquiring blended seismic data of a subsurface, the method comprising:
    towing first and second seismic sources S1, S2 above the subsurface;
    firing the first and second seismic sources S1, S2 with corresponding first and second lags, L1 and L2, respectively, relative to pre-determined shotpoints, wherein the first lag L1 is different from the second lag L2; and
    recording blended seismic data after firing the first and second seismic sources S1, S2, the blended seismic data including first traces having a first cross-talk free part with a first uncontaminated recording time length due to the first lag and second traces having a second cross-talk free portion of a second uncontaminated recording length due to the second lag, the second uncontaminated recording length corresponding to a larger exploration depth than the first uncontaminated recording time length.

11. The method of claim 10, wherein the step of recording comprises:
    acquiring the blended data so that the first traces are associated with a first subset of the pre-determined shotpoints with a first time lag and the second traces are associated with a second subset of the pre-determined shotpoints with a second time lag.

12. The method of claim 11, wherein the step of firing comprises:
    firing the first and second seismic sources to acquire the blended seismic data so that the first seismic source is shot the first subset of the pre-determined shotpoints and the second seismic source is shot at the second subset of the pre-determined shotpoints.

13. The method of claim 11, wherein the first and second time lags follow a predetermined curve, which varies with a geology of a surveyed surface.

14. The method of claim 11, wherein each of the first and second time lags are modified with a random time delay.

15. The method of claim 10, wherein each of the first traces has a first cross-talk part and each of the second traces has a second cross-talk part, and wherein the first cross-talk part has a length different from the second cross-talk part.

16. The method of claim 10, wherein a spatial density of the first traces is smaller than a spatial density of the second traces.

17. The method of claim 10, wherein the blended seismic data is acquired with a seismic survey having the first seismic source situated further away along an inline direction, than the second seismic source, to achieve the first uncontaminated recording time different from the second uncontaminated recording time.

18. A method for generating an image of a subsurface based on blended seismic data, the method comprising:
receiving the blended seismic data, which includes first traces have a first cross-talk free portion of a first uncontaminated recording time length and second traces having a second cross-talk free portion of a second uncontaminated recording length different from the first uncontaminated recording time length and corresponding to a larger exploration depth than the first uncontaminated recording time length;
processing the first traces and the second traces to generate first processed traces and second processed traces, respectively;
mapping the first processed traces and the second processed traces to a same sampling;
combining the first processed traces and the second processed traces as mapped to generate combined processed traces; and
generating an image of a structure of the subsurface based on the combined processed traces to locate a desired resource,
wherein the blended seismic data is acquired with a seismic survey having a first source towed further away along an inline direction, than a second source, to achieve the first uncontaminated recording time length different from the second uncontaminated recording time length.

* * * * *